United States Patent [19]

Julstrom

[11] Patent Number: 4,712,231
[45] Date of Patent: Dec. 8, 1987

[54] TELECONFERENCE SYSTEM
[75] Inventor: Stephen D. Julstrom, Evanston, Ill.
[73] Assignee: Shure Brothers, Inc., Evanston, Ill.
[21] Appl. No.: 597,734
[22] Filed: Apr. 6, 1984
[51] Int. Cl.[4] .......................... H04M 1/60; H04M 3/56
[52] U.S. Cl. ...................................... 379/202; 379/389
[58] Field of Search .............. 179/170.2, 81 B, 18 BC, 179/100 L; 379/202, 406, 407, 409, 389, 390, 388

[56] References Cited

U.S. PATENT DOCUMENTS

| | | | |
|---|---|---|---|
| 3,213,372 | 10/1962 | Kurvits | 455/225 |
| 3,437,758 | 4/1969 | Clement | 179/18 BG |
| 3,496,481 | 2/1970 | Torick et al. | 330/134 |
| 3,588,360 | 6/1971 | Knox | 179/81 B |
| 3,814,856 | 6/1974 | Dugan | 381/57 |
| 3,818,139 | 6/1974 | Snyder | 179/18 BC |
| 3,925,618 | 12/1975 | Kato et al. | 179/81 B |
| 3,944,736 | 3/1976 | Shepard | 358/185 |
| 3,947,639 | 3/1976 | Nicholas et al. | 179/18 BC |
| 3,958,084 | 5/1976 | Nicholas | 179/18 BC |
| 3,979,563 | 9/1976 | Kita et al. | 179/99 R |
| 4,006,310 | 2/1977 | Bayer | 179/37 |
| 4,008,376 | 2/1977 | Flanagan et al. | 179/18 BC |
| 4,090,032 | 5/1978 | Schrader | 179/18 B |
| 4,099,025 | 7/1978 | Kahn | 179/18 BC |
| 4,101,735 | 7/1978 | Bridenbaugh | 179/81 B |
| 4,149,032 | 4/1979 | Peters | 381/58 |
| 4,198,705 | 4/1980 | Massa | 367/126 |
| 4,215,241 | 7/1980 | Pinkney, Jr. | 367/197 |
| 4,513,177 | 4/1985 | Nishino et al. | 179/81 B |
| 4,560,840 | 12/1985 | Hansen | 179/81 B |

OTHER PUBLICATIONS

D. Dugan, "Automatic Microphone Mixing", *Journal of the Audio Engineering Society*, Jul./Aug. 1975, vol. 23, No. 6, pp. 442-449.
Industrial Research Products, Inc., "Voice-Matic Microphone Mixer DE-4013".
Rauland Spectrum-Master, "Model 3535 Log-8 Microphone Mixer".
James B. Lansing Sound, Inc. "Model 7510 Automatic Microphone Mixer".
Altec Sound Products Division, "1628A Automatic Microphone Mixer".

*Primary Examiner*—Gene Z. Rubinson
*Assistant Examiner*—R. Vaas
*Attorney, Agent, or Firm*—Allegretti, Newitt, Witcoff & McAndrews, Ltd.

[57] ABSTRACT

A teleconferencing system for connection to telephone lines or other communication links. Directionally gated microphones receive local speech for audio send signal transmission to the far end on the telephone line, and audio receive signals from the far end are output locally via a loudspeaker. The outgoing send signals and incoming receive signals are automatically suppressed in accordance with user and setup controls (volume and suppression) and in accordance with the strength of the incoming receive signal. When the system is in a send mode, the receive signals are suppressed to a lower audible level; when the system is in a receive mode, the send signals are suppressed. The mode of the system is switched during conversation. When simultaneous talking (speech from both ends) occurs, priority is given to the interrupting party.

27 Claims, 25 Drawing Figures

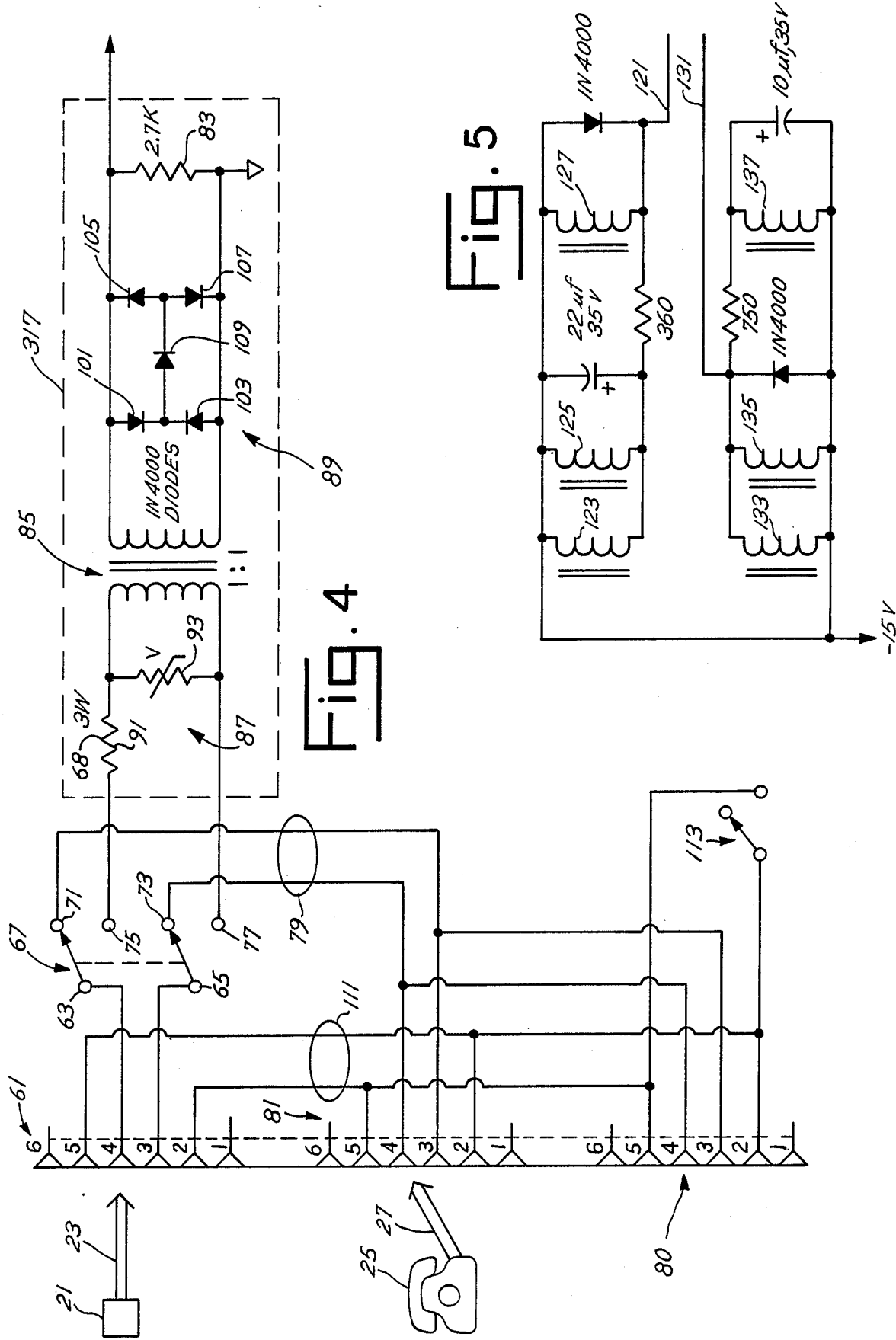

TELECONFERENCE SYSTEM

BACKGROUND OF THE INVENTION

Group teleconferencing with loudspeakers and microphones allows a freedom of movement and a degree of interaction among participants that is not possible when conventional telephone handsets are used. Typically, a group teleconference system will have a microphone to receive the speech of various participants in the room and a loudspeaker from which the participants may hear the voices of persons on the other end of the line. Unfortunately, problems are introduced when talkers are several feet away from the microphone and by the acoustical coupling (feedback) from the loudspeaker to the microphone.

Moving a microphone away from a talker's mouth will reduce the level of direct speech pickup relative to room noise and reverberation. This reduces the clarity and intelligibility of the speech and can result in the characteristic "hollow" or "bottom of the barrel" sound often associated with conference sets.

The acoustical coupling from the loudspeaker to the microphone is a problem because it forms a feedback path which, if not controlled, will cause howlback and echo. This is generally not a problem in telephone handsets because the coupling from earpiece to mouthpiece is very small.

The system may be a "four-wire" system, i.e., having separate receive and transmission paths. In such a case, where a conference system exists at both ends, the acoustical coupling of both systems creates a feedback path which can be unstable and causing howling. An echo problem also may occur. If the transmission link has significant time delay associated with it (i.e., about ¼ second each way for a "single hop" satellite connection), a microphone signal at one end which is acoustically coupled and returned by the far end will be heard by the talker as a delayed echo of his own voice. This can be a significant distraction and can even make conversation impossible.

Also, the system may be a "two-wire" system, i.e., standard telephone lines where the send and receive paths are the same. In such a case, local coupling of the send signal to the receive input completes the acoustic feedback path, again with potential instability an howling.

Because of the above requirements, attempting to maintain "full-duplex" operation) both loudspeakers and microphones fully active at all times) generally requires extensive acoustical treatment of the room, careful loudspeaker and microphone placement, and accepting low, fixed speaker volume settings. Even then, weak received telephone signals could not be brought up in level because of the increased gain inside the feedback loop this would require. Satellite delayed echoes would still make the system unusable.

Heretofore, the need for careful acoustic design, has been reduced by utilizing "half-duplex" operation. Either the microphone or the loudspeaker is always suppressed (attenuated) depending on the assumed direction of conversation. This suppression is typically 40 dB or more.

While this solves the acoustic feedback related problems, it has often done so at the expense of interactive, natural conversation. Beginning syllables and words may be lost; neither end of a conference may be able to interrupt the other; and both ends may be talking without hearing each other.

It is therefore an object of the present invention to provide an improved teleconferencing system which automatically controls feedback loop gains for feedback stability in both four-wire and two-wire applications under changing operating conditions.

It is another object of the present invention to automatically control feedback loop gains for echo control under changing conditions in four-wire applications with transmission links having significant time delay.

It is another object of the present invention to provide an improved teleconferencing system which automatically controls feedback loop gains while still maintaining the capability for fully interactive conversation using conversationally oriented send-receive direction switching with full interrupt capability.

It is another object of the present invention to provide a teleconferencing system which improves sound quality by reducing microphone pickup of room noise and reverberation, optimizing electrical and acoustical frequency responses, and providing manual and automatic loudspeaker level adjustments.

It is another object of the present invention to provide an improved teleconferencing system which facilitates interface with tape players, tape recorders, auditorium sound reinforcement systems, etc.

It is another object of the present invention to provide an improved teleconferencing system having the capability to work in bridged modes, i.e., modes in which more than two locations are interconnected, as for example, conference calls.

SUMMARY OF THE INVENTION

These and other objects are achieved in a teleconferencing system connectable to a communication link for sending and receiving audio signals between the local and far end of the link. A microphone receives local speech and passes microphone signals to the system for generating outgoing send signals. A loudspeaker produces speech from loudspeaker signals which are generated by the system from incoming receive signals. The amplitude of the loudspeaker signals and the send signals are automatically controlled to facilitate interactive conversation between persons at both ends of the link.

BRIEF DESCRIPTION OF THE DRAWINGS

FIG. 4 is a schematic diagram of the input/output jacks and line interface circuit of the teleconferencing system embodiment of FIG. 3A;

FIG. 5 is a schematic diagram of the relay system of teleconferencing system embodiment of FIG. 3A;

DESCRIPTION OF THE PREFERRRED EMBODIMENT

Figure 1:
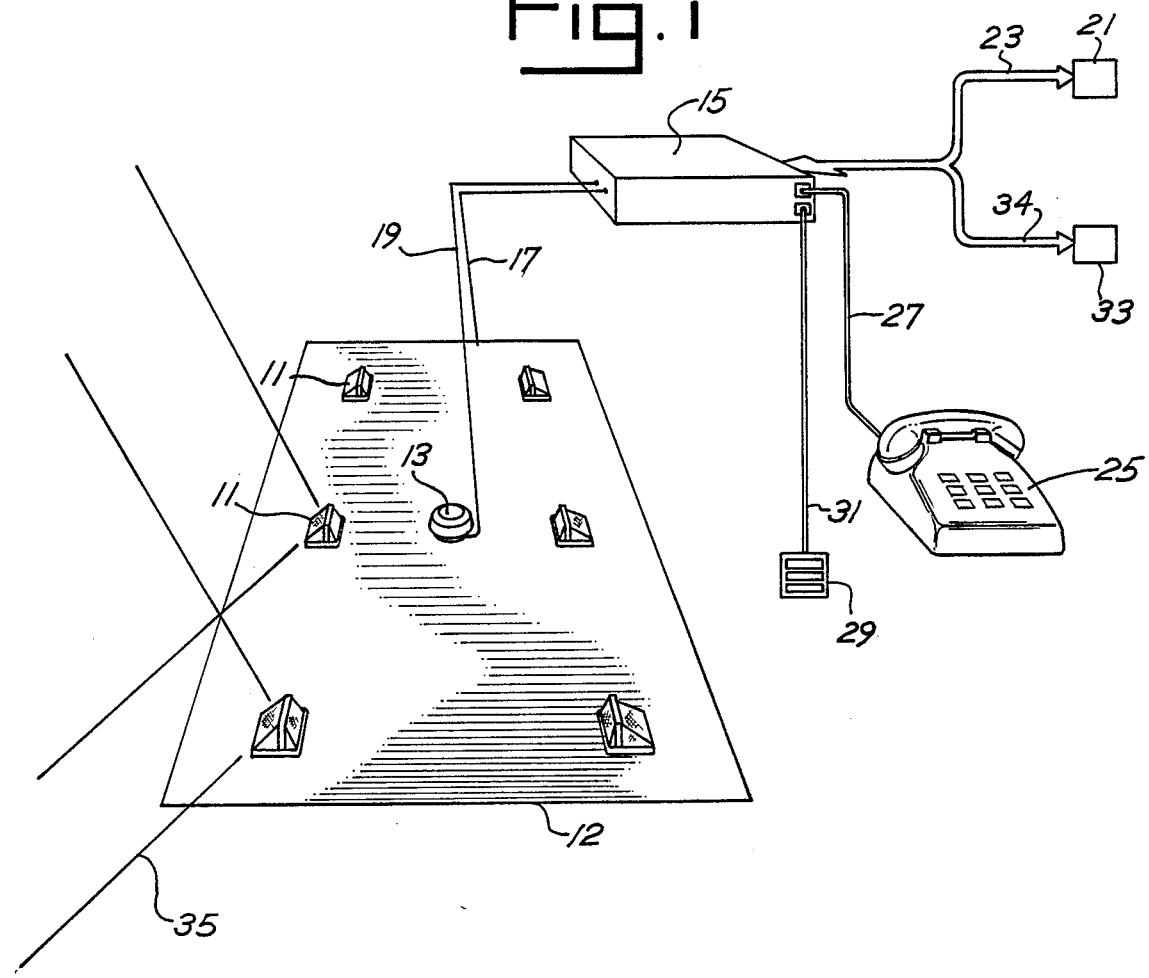
FIG. 1 is a diagrammatic and perspective view of a teleconferencing system embodiment of the present invention.

Referring to FIG. 1, an embodiment of a telephone conferencing system of the present invention is shown. The system includes a plurality of voice actuated microphones 11 shown positioned facing outwardly towards the perimeter of a conference table 12. A loudspeaker 13 is positioned in the center of the conference table to the back side of the microphones. Microphones 11 and speaker 13 are connected to a control unit 15 of the system by cables 17, 19, respectively, which may pass through holes drilled in the table or may rest on the table top.

Electronic circuitry found within control unit 15 receives microphone signals via cables 17 and feeds an audio signal to loudspeaker 13 via cable 19. Control unit 15 is interconnected to a telephone line wall jack 21 by means of a conventional telephone wire 23 for conventional "two-wire" connections. A telephone 25 and a remote control 29 are also connected to control unit 15 by telephone wire 27 and a cable 31. Preferably, control 29 is resting on conference table 12. The operator utilizes control 29 for selecting whether telephone 25 or the microphones 11/speaker 13 are to be connected to telephone line wall jack 21. The operator may also use control 29 for loudspeaker volume adjustment and mute control.

The teleconferencing system of FIG. 1 has a further capability of being interconnected with an additional two-wire line, as diagrammatically illustrated at 33, to form a four-wire system. Such a four-wire system may be a dedicated system (other than a conventional telephone line) for satellite link communication, for example.

Each microphone 11 reduces undesired sound pickup (room noise, reverberation, and loudspeaker sound) by being maintained in a normally OFF condition until needed. A microphone 11 is automatically gated on only when the microphone is immediately in use. A unique direction-sensitive gating principle is applied to turn a microphone on only in response to a sound source within its "acceptance angle" 35. A microphone will not gate on for diffuse room noise and reverberation, or for sound sources outside its acceptance angle. This principle of operation yields excellent gating sensitivity to quiet spoken sounds without the need for initial adjustments or readjustments, even under varying acoustic conditions.

The circuitry of control unit 15 provides total system gain control under varying operating conditions, while still maintaining the capability for fully interactive conversation. In the absence of local speech, the microphones are gated off and totally break the acoustic coupling path. No echo of loudspeaker sound will be returned to the far end. The microphones will turn on quickly and reliably in response to speech, without chopping syllables or words. The cardioid (unidirectional) pickup pattern of the microphones minimize acoustic coupling from the loudspeaker and pickup of room noise and reverberation while gated on. If multiple microphones gate on (due to several simultaneous talkers or overlapping acceptance angles), the microphone gains are automatically reduced to maintain constant total acoustic coupling.

When local speech gates on a microphone 11 and interrupts received speech, the loudspeaker level will be suppressed, but only to the degree necessary to maintain feedback stability and/or echo control for the specific acoustic coupling conditions in a given installation. When local speech is interrupted by the far end, the outgoing microphone signal will be suppressed and the loudspeaker hear at normal level. The receive gain may be varied freely since the actual amount of suppression is automatically compensated to maintain a constant feedback loop gain. The receive gain can vary due to user volume control adjustment or due to an internal receive compressor, which automatically compensates for variations in received signal strength.

The necessary send/receive direction switching to determine which signal path is suppressed occurs in an unobtrusive, conversationally oriented manner. Switching is sensitive and fast, avoiding clipped words. When both ends talk simultaneously, priority is given to the interrupting party, maintaining natural interaction. Systems on each end of a conference will act in a complementary manner. If one end is in a "send" mode, the other will be in a "receive" mode, and vice versa. Either end can always "get through" without yelling.

Microphone 11 is of the type disclosed in copending U.S. patent application, Ser. No. 429,430, filed Sept. 30, 1982, now U.S. Pat. No. 4,489,442, and assigned to the same assignee as the present application, which is incorporated herein by reference. As shown in FIG. 1, microphone 11 is enabled to sounds arriving from its front in a generally semi-conical spatial area 35 (FIG. 1) as, for example, at or less than a 60° angle off axis to the front of the microphone 11, hereinafter referred to as the microphone's acceptance angle. Only sound impinging microphone 11 from region 35 gates microphone 11 on for transmission to the far end. As will suggest itself, microphones other than surface mounted microphones may be utilized with control unit 15, as for example, lavalier microphones, probe style microphones, etc.

Figure 2:
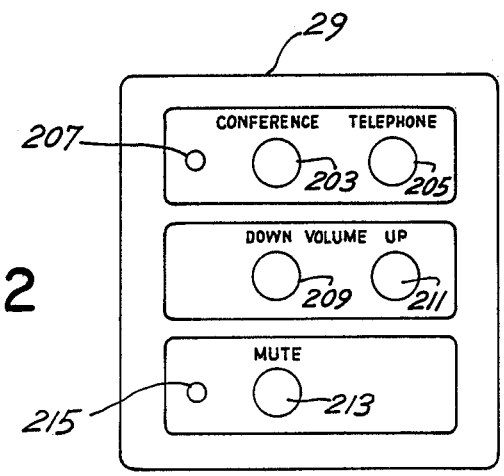
FIG. 2 is a plan view of remote control 29 of the embodiment of FIG. 1.

Referring to FIG. 2 remote control 29 includes a conference button 203 and a telephone button 205. Actuation by the user of one of buttons 203, 205 switches the system to a conference mode or a telephone mode, respectively. In the telephone mode, telephone 25 (FIG. 1) is electrically connected to telephone line wall jack 21, bypassing the circuitry of control unit 15. In the conference mode, wall jack 21 is connected to microphones 11 and loudspeaker 13 via the circuitry of control unit 15. A visual display lamp 207 (FIG. 2) is positioned adjacent conference button 203 and is lit when the system is in the conference mode.

Remote control 29 also includes a volume control comprising a volume down button 209 and a volume up button 211. Depression of either button 209, 211 serves to increment in steps the volume of sound from loudspeaker 13.

A mute button 213 is included in the remote control and is actuable for providing mute control to the system as described hereinafter. A visual display lamp 215 is positioned adjacent mute control button 213 for visually indicating that the system is in the mute mode.

Figure 3A:
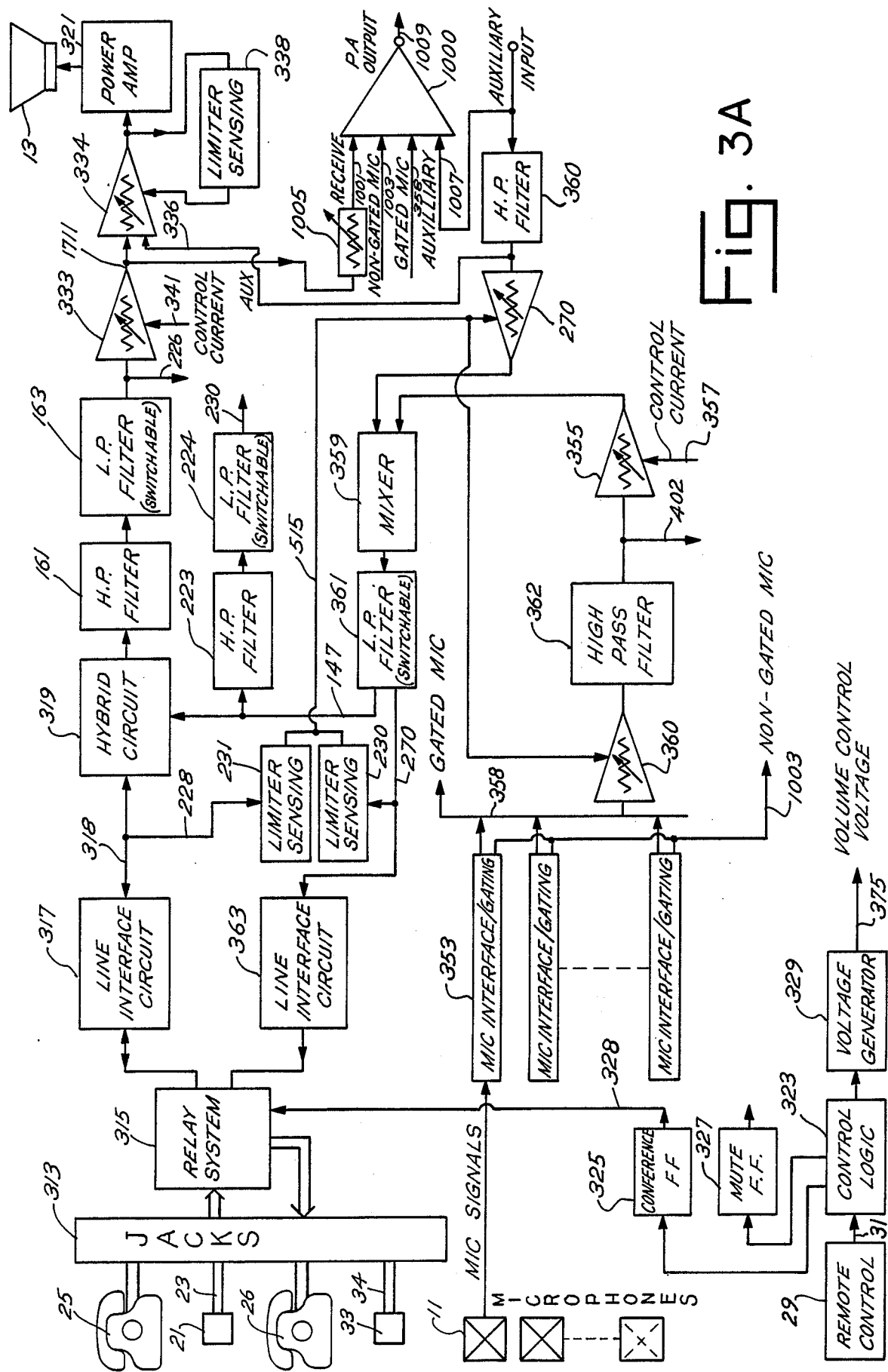
FIGS. 3A and 3B are block diagrams of the circuitry of the teleconferencing system embodiment of FIG. 1.
Figure 3B:
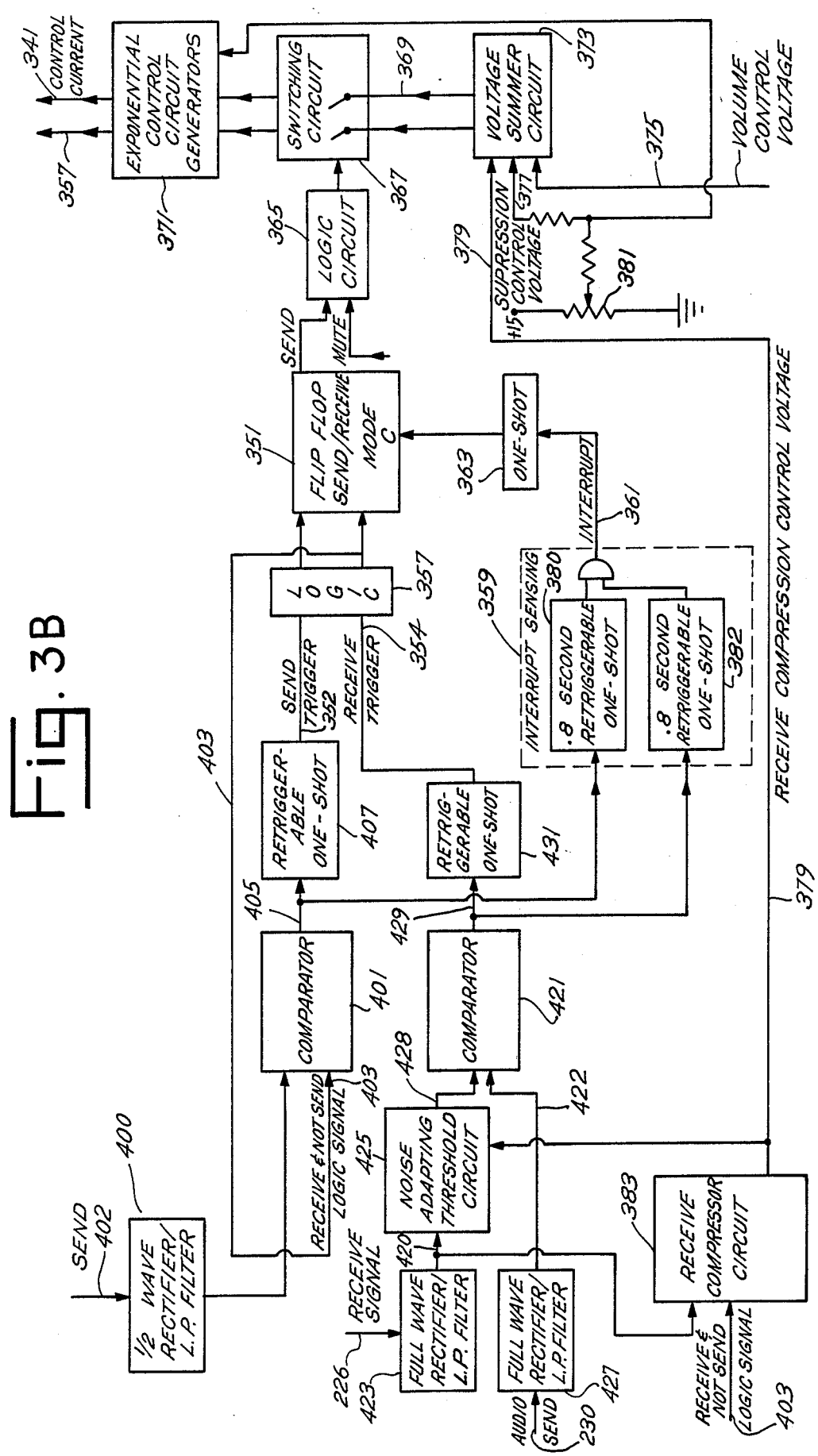

Referring to FIGS. 3A and 3B, the circuitry of control unit 15 is illustrated in block form. A plurality of input/output jacks 313 are connectable to telephone 25 (as well as a second telephone 26, if necessary) and to telephone line jacks 21, 33. A relay system 315 serves to connect the line jacks 21, 33 to either the telephones or to the conference microphones and loudspeaker.

Remote control 29 is electrically connected to the control unit via cable 31. Input from remote control 29 is received by a control logic 323 for actuation of a pair of flip flops 325, 327. Flip flop 325, the CONFERENCE flip flop, is enabled for providing a control signal which determines whether the system is in the telephone or conference mode. Flip flop 327, the MUTE flip flop, is enabled for providing a control signal which determines whether the system is in the mute mode or the normal non-muted mode. CONFERENCE flip flop 325 generates a relay control drive signal along a path 328 for actuation of relay system 315 in accordance with the telephone or conference mode selected by the user via remote control 29.

When in the conference mode, relay system 315 connects the line jack 21 to the electrical circuitry of unit 15, passing audio signals from the line jack 21 to a line interface circuit 317. Also, relay system 315 connects line jack 33 to a line interface circuit 363. Interface circuits 317, 363 couple audio signals as well as electrically isolate the D.C. signal of the telephone line from the control unit, serve to "hold" the telephone line by providing a resistive D.C. path across the line, and provide over-voltage protection to the circuitry.

In the four-wire mode, interface circuit 317 is the receive signal interface (receiving audio signals from one two-wire line) and interface circuit 363 becomes the send signal interface (sending audio signals onto the other two-wire line). As understood, transmission links other than telephone lines may be utilized, i.e., satellite or direct-wired connections.

When using a two-wire system, line interface circuit 317 handles both send and receive signals. A conventional active (transformerless) hybrid circuit 319 serves to extract the receive signal from an output conductor 318 of interface circuit 317. Hybrid circuit 319 also impresses a send signal onto conductor 318 for transmission back through line interface circuit 317.

The receive signal extracted from interface circuit 317 is passed from hybrid circuit 319 to a power amplifier 321 and then to loudspeaker 13. The level of the signal transmitted to the loudspeaker is controlled by a control amplifier 333. The gain of control amplifier 333 is varied by a control current appearing on a conductor 341.

From control amplifier 333, the receive signal is passed through a mixer limiter 334 for mixing with an auxiliary signal (described hereinafter) on conductor 336. The level of the output mixer limiter 334 is limited by the action of limiter sensing circuit 338 to prevent overload (distortion) in the power amplifier 321.

Hybrid circuit 319 places a send signal onto conductor 318 for output to line jack 21. The send signal originates from gated microphones 11 and any auxiliary input, mentioned above. The send signal is still applied to jack 33 through interface circuit 363, as in the four-wire mode.

Each microphone 11 feeds signals into a respective microphone interface/gating circuit 353 for generation of a gated and non-gated microphone signal. The gated microphone signals are combined onto a single conductor 358. Ordinarily, as increasing numbers of microphones gate on, the acoustic feedback path gain would increase due to the increased microphone pickup. This is prevented by automatic gain adjustment occurring at conductor 358 which reduces microphone gains as additional microphones gate on. This is accomplished through appropriate series coupling resistors and a parallel loading resistor as described in copending U.S. patent application, Serial No. 429,430, now U.S. Pat. No. 4,489,442.

The combined gated microphone signals appearing on conductor 358 pass through a control amplifier 355 prior to entry into the hybrid circuit. The gain of control amplifier 355 is varied by a control current appearing on a conductor 357.

The send signal output from control amplifier 355 is mixed with the auxiliary signal (if desired) at mixer 359 and then filtered by a low pass filter 361 prior to entry into hybrid circuit 319. From the hybrid circuit 319, the send signal is passed through interface circuit 317 and onto the telephone line via jack 21. The send signal also passes from filter 361 to telephone interface circuit 363 for transfer to the appropriate telephone line via jack 33.

The combined gated microphone signals are passed through an amplifier/limiter 360 and a high pass filter 362 prior to entry to control amplifier 355. The level of the output of amplifier/limiter 360 is limited by a send limiter drive signal which is developed by a pair of limiter sensing circuits 230, 231. The send limiter drive signal is also fed to an amplifier/limiter 270 which limits the level of the auxiliary input signal to mixer 359. The action of the send limiting circuitry (230, 231, 270, 360) prevents excessive signal levels being sent to the telephone lines.

The control current input to control amplifiers 333, 355 is governed by a send mode/receive mode direction decision. As described previously, potential feedback loop gain instabilities are controlled by inserting suppression in the send path during the receive mode and in the receive path during the send mode. The mode is determined by a SEND flip flop 351, shown in FIG. 3B.

Flip flop 351 is controlled by a logic circuit 357 and a one-shot 363. A send trigger signal is input to logic circuit 357 along a conductor 352, and a receive trigger signal is input along a conductor 354 to the logic circuit.

Logic circuit 357 controls the setting and resetting of SEND flip flop 351 in accordance with the send trigger and receive trigger signals. When the send trigger is high and the receive trigger is low, flip flop 351 is set (Q output is High). When the send trigger is low and the receive trigger is high, flip flop 351 is reset (Q output is Low). When the send trigger and receive trigger are both high or both low, logic 357 generates logic low signal to flip flop 351 such that flip flop 351 retains its last state, unless a clock signal is received from one-shot 363 causing flip flop 351 to change states.

The send trigger signal is driven High when local speech occurs. A retriggerable one-shot 407 generates the send trigger signal when local speech is detected. One-shot 407 holds the trigger signal for 0.2 seconds following speech detection in order to bridge pauses in local speech.

The receive trigger signal is driven high when distant received speech is sensed. A retriggerable one-shot 431 generates the receive trigger signal for 0.3 seconds following speech detection in order to bridge pauses in distant speech.

The 0.2 and 0.3 second timings determine the minimum interruption times when the interrupted party does not yield. These hold times are barely long enough to cover the inter-syllabic pauses. The offset in the timing (0.2 seconds for send versus 0.3 seconds for receive) provides for proper operation in the specific instance when a short word is received immediately following local speech. A false send trigger signal will be generated due to the microphone pickup of loudspeaker sound since the microphones will not yet have gated off. (As described hereinafter in connection with FIGS. 23, 24, the microphones remain gated on for a short time after the cessation of local speech, but will gate off within 0.8 seconds if no local speech occurs.) This will not generate a false send interruption because of the interruption timing described hereinafter. However, after the end of the word, the false send trigger will tend to be maintained longer than the correct receive trigger due to the reverberant decay of loudspeaker sound in the room. This would cause SEND flip flop 351 to incorrectly set to the send mode following received speech. The offset of 0.1 second in the hold times is adequate to ensure that the false send trigger will end before the correct receive trigger, preventing erratic operation under this condition.

An interrupt sensing circuit 359 is formed from a pair of 0.8 second retriggerable one-shots 380, 382. The output signals from one-shots 380, 382 are functionally ANDed together to generate an interrupt signal appearing on conductor 361. The interrupt signal appearing on conductor 361 triggers one-shot 363 for clocking SEND flip flop 351.

Input signals appearing on conductors 405, 429 represent send sensing and receive sensing, respectively. Such signals are fed to one-shots 407, 431, respectively, as well as to the inputs of one-shots 380, 382, respectively, of the interrupt sensing circuit 359.

The interrupt signal appearing on conductor 361 is a logic high signal only when both send and receive signals have been sensed within the previous 0.8 seconds. The interrupt signal is an indication that both sides have talked within the last 0.8 seconds. The leading edge of the interrupt signal represents the initiation of simultneous (both ends) talking. The leading edge of the interrupt signal is delayed by one-shot 363 for about 0.2 milliseconds in order to permit logic circuit 357 to generate appropriate outputs to flip flop 351. The delayed leading edge of the interrupt signal output from one-shot 363 clocks flip flop 351 for switching its output logic state.

Thus, when a party interrupts the conversation, flip flop 351 switches output states giving the interrupting party priority. Priority is given by the appropriate suppression of the send or receive signal, as described above. The successful interruption (switching of flip flop 351) occurs only upon the generation of a new interrupt signal along conductor 361. An interrupt can occur only after at least one of the parties has been quiet for at least 0.8 seconds. Thus, speech after a pause of at least 0.8 seconds is determined to be new speech and given an interrupt priority. Speech after pauses of less than 0.8 seconds is considered continuation of previous speech and does not cause an interrupt.

Thus, the circuitry of the embodiment of the present invention is different from conventional circuitry in that the present embodiment does not give interrupt priority to either send signals or to receive signals, nor does the circuitry give interrupt priority to the louder signal. Priority is given to the interrupting party, be it send or receive. As shown, this is determined on the basis of the timing, ordering a sequencing of receive and send sensing.

The output of SEND flip flop 351 is fed to a logic circuit 365 for actuation of a switching circuit 367 in accordance with the state of flip flop 351 (indicating send mode or receive mode). Switching circuit 367 serves to pass signals from a voltage summer circuit 373 to exponential control current generators 371. The signals from summer circuit 373 determines the magnitudes of the control current generated on conductors 341, 357.

Voltage summer circuit 373 sums together three voltages for forming the voltages for application to current generators 371 in a manner controlled by logic circuit 365. The three voltages summed by circuit 373 appear on input conductors 375, 377 and 379. A loudspeader volume control voltage is impressed on conductor 375 by a voltage generator 329 (FIG. 3A) which is responsive to the remote control via logic 323. A suppression control voltage is impressed on conductor 377 by a manually preset variable resistor 381 connected between a voltage source and ground, as shown. The voltage impressed upon conductor 379 is a receive compression control voltage generated by a receive compressor circuit 383, described hereinafter.

There are two pairs of possible control signals values which are applied to current generators 371, one pair of which is chosen by switching circuit 367. The control signals are defined for formulating the control currents on leads 357, 341 such that; (1) the user may vary the receive loudspeaker volume, (2) the received signal strength may be automatically compensated for, and (3) the appropriate suppression will be applied both initially and in conjunction with the just stated control functions (1) and (2).

Referring again to send sensing, the send trigger signal is generated by a comparator circuit 401 which receives a signal representative of the level of the combined gated microphone signal. The combined gated microphone signal on conductor 358 passes through amplifier-limiter 360 (FIG. 3A) and then through high pass filter 362 (FIG. 3A) and then through half wave rectifier/low pass filter 400 (FIG. 3B). Comparator circuit 401 includes a threshold level which when overcome by the output signal of half wave rectifier/low pass filter 400, causes a send sense signal to be generated triggering one-shots 407 and 380. A receive-and-not-send logic signal is also input to comparator circuit 401 along conductor 403. This raises the threshold of comparator circuit 401 only when the far end is talking and there is no local speech. Thus, a slightly raised microphone level is needed to interrupt incoming speech to avoid unwanted interruption from paper rustlings, etc.

The send sensing circuitry (400, 401) will, in general, not respond to loudspeaker sound or background room noise since the signal sensed is the combined gated microphone signal 358. When using the direction sensitive microphones 11 in the arrangement of FIG. 1, the microphones will gate on and apply signals to conductor 358 only for local speech and not for loudspeaker sound or background room noise. Thus, the properties of the microphones and associated microphone interface/gating circuitry are exploited to differentiate between local speech and other sounds in the room which could otherwise cause false send sensing. This avoids false send direction switching, particularly due to loudspeaker sound while still maintaining good sensitivity to local speech even in the presence of stong loudspeaker output. This is important for good send interruption capability.

The send sensing circuitry (400, 401) will, however, respond to loudspeaker sound picked up by microphones 11 once they have been gated on by local speech. As discussed previously, this generates a false send trigger and could generate a false send interruption. To prevent this, the interrupt sensing circuit 359 requires a 0.8 second pause in the sensed send signal before generating an interruption. Because microphone interface/gating circuits 353 will gate microphones off in less than 0.8 seconds following local speech (as described previously and hereinafter), the loudspeaker sound picked up by the microphones will not generate a false interruption. A send interruption can occur only at the initial gating on of a microphone 11 which can occur only for local speech.

During the time that the microphones are gated on, some loudspeaker sound will be returned to the send output. A similar conference system at the other end could sense this returned signal falsely as a receive interruption. This is again prevented by the action of the far end systems interrupt sensing circuit which needs a pause of at least 0.8 seconds in its received signal to generate a receive interrupt. The local conference system will not return its loudspeaker sound to the far end for longer than 0.8 seconds following local speech, preventing the far end from generating a false receive interruption.

It can be seen that the symmetrical send/receive timing of each system combined with the sensitive send and receive sensing causes the send timing of one side to be essentially locked together with the receive timing of the other side and vice versa. This will be true even when the transmission link connecting the two has significant time delay (e.g., satellite link). When operated in a bridged mode (more than two systems), a system can interrupt all other systems equally and can be interrupted by all other systems equally.

In order to sense receive for generating a receive trigger signal along conductor 354, the receive signal, after passing through high and low pass filters 161, 163 (FIG. 3A), is applied to a full wave rectifier/low pass filter 423 for generating a signal on conductor 420 which is representative of the level of the receive signal. The signal on conductor 420 is applied to a noise adapting threshold circuit 425. When the signal appearing on conductor 420 overcomes a threshold level determined by circuit 425, the signal on conductor 420 is passed to a comparator 421 via a conductor 428. When the signal appearing on conductor 420 does not overcome the threshold of circuit 425, conductor 428 is held at ground.

A second signal (representing the level of the send signal) is applied to comparator 421 via a conductor 422. In the absence of send output (local speech), the signal appearing on conductor 422 is substantially zero. However, a slight voltage level is impressed on conductor 422 such that comparator 421 does not generate a receive trigger onto conductor 429 when conductor 428 is at ground.

In the absence of significant received background noise, the threshold of circuit 425 is at a low level modified slightly by the output of receive compressor circuit 383. Circuit 383 modifies the threshold slightly in accordance with average received signal strength. To prevent false receive sensing in the presence of high received background noise (due to noisy telephone lines for example), the threshold of circuit 425 adapts to steady background noise levels appearing on conductor 420. Received speech signals must overcome received background noise levels by 6dB to generate a signal on conductor 428.

When operated in the two-wire mode, the received signal from hybrid circuit 319 applied to high pass filter circuit 161 will generally be contaminated by large amounts of send signal during local speech due to imbalance and leakage in hybrid circuit 319. This could generate false receive sensing due to local speech. To prevent this, the send signal feeding hybrid circuit 319 is also applied to high and low pass filters 223, 224 (FIG. 3A) and then to full wave rectifier/low pass filter 427 (FIG. 3B) along conductor 230. Filter circuits 223, 224 are identical to filters 161, 163 so that the send signal appearing on conductor 230 undergoes identical frequency response shaping as the received signal appearing on conductor 226. Also, full wave rectifier/low pass filters 423, 427 are substantially identical.

The output of full wave rectifier/low pass filter 427 which appears on conductor 422 is applied to comparator 421. The level of the signal on conductor 422 is scaled to be greater than the largest signal on conductor 428 which could be due to send signal contamination. This prevents false receive triggers from send contaminated receive signals.

The circuitry, while preventing false receive sensing, should not excessively inhibit desired sensing of received signals in the presence of strong outgoing send signals. This is necessary so that the distant party can interrupt the local speech. This is difficult because the average level of the receive signal on the two-wire line is often much weaker than the average level of the outgoing send signal.

Very fast low pass filter time constants, i.e., 3 milliseconds, are used in circuits 423 and 427. These fast time constants are possible due to high pass filters 223 and 161 which eliminate low frequencies, and due to precision full wave rectifiers 423 and 427 which reduce the effect of the relative phase of the signals on conductors 230 and 226, and due to the careful matching of filters 223, 161, and 224, 163 and the matching of full wave rectifiers/low pass filters 423, 427. The three millisecond low pass filter time constant of circuits 423, 427 comfortably encompass electrically delayed, reflected send signals returning from local telephone lines and prevent false receive sensing from these.

The three millisecond low pass filter time constant of circuits 423 and 427 allows weak received speech to be detected in the presence of much stronger send speech. The sensing can occur during very short send pauses, drop outs, or even dips in the send wave form. The detection action can be regarded as sensing signals in the send contaminated receive signal which are not correlated in time with the send signal within a substantial three millisecond window.

The net result is receive sensing which is very sensitive even in the presence of strong outgoing speech, yet does not result in false receive sensing as a result of send speech or background telephone line noise. This accurate receive sensing is used in conjunction with the accurate send sensing to determine send mode/receive mode direction decisions with full interruptability in both directions as previously described.

Receive compressor circuit 383 generates the receive compression control voltage appearing on conductor 379, which automatically adjusts the loudspeaker level to compensate for variations in receive signal strength. The signal appearing on conductor 420, which represents the level of the receive signal, is applied to receive compressor 383. This signal is used to update a control voltage which is fed as the output of compressor 383 onto line 379. The receive-and-not-send logic signal appearing on condcutor 403 is applied to receive compressor 383 to allow the updating to occur only when speech is being received but no speech is being sent. Thus, the control voltage on conductor 379 is adjusted in accordance with the average level of the receive speech but not in accordance with send contamination in the receive signal.

Referring again to FIG. 3A, a mixer 1000 receives four signal inputs on conductors 1001, 1003, 358, 1007 for generating a combined signal output onto conductor 1009. Output conductor 1009 is the PA output which may be connected to a sound reinforcement system, recording apparatus, etc. Conductor 358 carries the combined microphone signal, conductor 1003 carries the combined non-gated microphone signal, conductor 1007 carries the auxiliary input signal and conductor 1001 carries the receive signal which passes through a PA receive balance control 1005. The ouput appearing on conductor 1009 then contains all conference signals.

As shown in FIG. 3A, an auxiliary input is provided for input of non-microphone input signals such as pre-recorded tape playback. Such auxiliary will appear in the local loudspeaker, the PA output, and will be sent to the far end without being suppressed during send-/receive direction switching.

FIG. 4 illustrates, in more detail, the connection of input jacks 313 (FIG. 3A) to line interface circuit 317 via relay system 315. Telephone line 23 is connected to a conventional 6-pin connector 61; only four pins of the connector are used. As understood, conventional telephone wire includes four wires; however, only two of the wires carry the audio signal. The two wires of line 23 which carry the audio are connected to pins 3 and 4 of connector 61. The other two wires of line 23 are connected to pins 2, 5 of connector 61.

Pins 3, 4 of connector 61 are connected to the input wiper terminals 63, 65 of a relay switch 67. Relay 67 is electrically operable for switching connection of input terminals 63, 65 to one of two pairs of connectors, 71, 73 or 75, 77. Connectors 71, 73 are connected by a pair of wires 79 to a six-pin connector 81. Telephone 25 is connected via lead 27 to jack connector 81, so that telephone 25 can be connected directly to the line jack 21 by operation of relay 67.

Relay 67 is electrically operated for switching connection of input terminals 63, 65 to a pair of terminals 75, 77. Terminals 75, 77 form the audio input/output terminals of the teleconferencing system when operating in a two-wire phone mode. The audio voltage is developed across a resistor 83 as the output/input of line interface circuit 317.

Between resistor 83 and relay terminals 75, 77, a coupling transformer 85 serves to isolate the D.C. signal of the telephone line from entering the teleconferencing control unit 15. Transformer 85 also "holds" the telephone line, as understood.

Two over voltage protection circuits 87, 89 are located on either side of transformer 85 and function to protect the teleconferencing control circuitry from lightning striking the telephone lines, or other high voltage surges on the line. Voltage protection circuit 87 is formed of resistor 91 and varistor 93 electrically connected as shown. Voltage protection circuit 89 is formed by five diodes 101–109 interconnected as shown.

As will suggest itself, a second telephone jack 80 may be connected in parallel with jack 81 for permitting telephone plug in of phone 25 in a second position. For example, telephone 25 may be plugged into the front or the rear of the teleconferencing control unit 15 (FIG. 1), wherever convenient.

As described above, a conventional phone jack input includes two additional wires. Such wires may be connected between jacks 61, 81 by an additional pair of wires 111. A second relay 113 (one wiper shown) may be utilized between the pair of wires 111 for shorting the same during the conference mode. As understood, some telephone systems require a closure between pins 2, 5.

Line interface circuit 363 (FIG. 3A) is identical to interface 317. Interface 363 will be connected to three input/output jacks similar to jacks 61, 81, 80. A third relay similar to relay 67 will be utilized and the circuit will make use of the other relay wiper of relay 113 in a similar fashion.

Referring to FIG. 5, a relay actuation circuit is illustrated for the three relays of relay system 315, as previously described. A positive 15 volts is impressed along a line 121 to energize three relay coils 123, 125, 127 for switching the system into the conference mode. A positive 15 volts is impressed along line 131 for actuation of three relay coils 133, 135, 137 for switching the system into the telephone mode. The signals appearing on conductors 121, 131 are generated by the telephone/conference flip flop 325 (FIG. 3A), described in detail hereinafter in relation to FIG. 11. The RC circuits of FIG. 5 sequence the relay operations in accordance with telephone system requirements.

Figure 6:
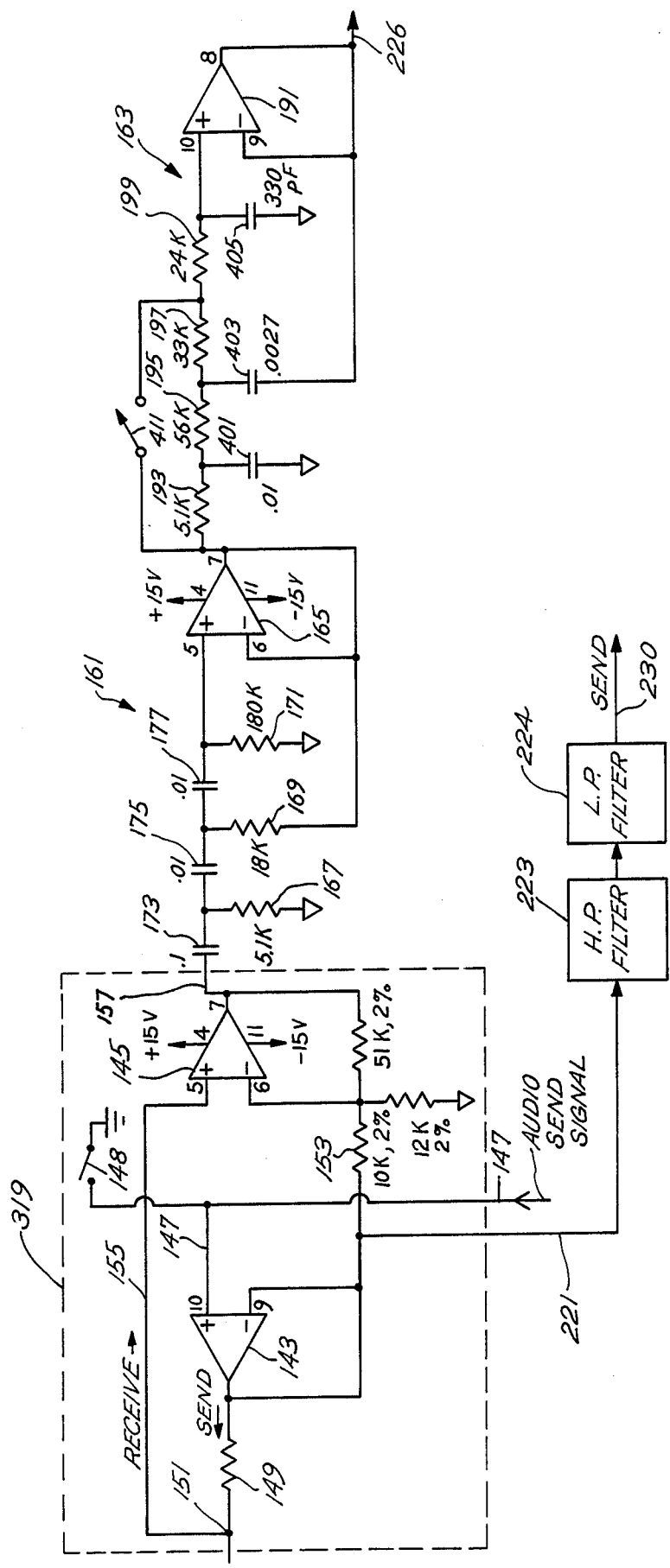
FIG. 6 is a schematic and block diagram of the hybrid circuit and receive path high pass and low pass filters of the teleconferencing system embodiment of FIG. 3A.

Referring to FIG. 6, hybrid circuit 319 is formed from a pair of operational amplifiers 143, 145. Op amp 143 receives the send signal along a lead 147. The send signal output is buffered by op amp 143 and passed through a resistor 149 and then across audio input/output resistor 83 (FIG. 4). In the event that a four-wire system is used, a switch 148 grounds the send signal of lead 147 so that hybrid circuit 319 is used for receive signal input only.

The send signal output of op amp 143 is fed back via resistor 153 to the inverting input of op amp 145. The non-inverting input of op amp 145 receives the receive signal (which is contaminated with send signal) along lead 155 from across resistor 83. Op amp 143 serves to extract the receive signal; the send signal applied at the non-inverting input serves to cancel a portion of the send contamination in accordance with the degree of line impedance matching achieved, as understood. The output of op amp 145 which appear along line 157 is the receive signal still contaminated with some send signal, which is amplified to a usable level. This receive signal is the audio signal which, after further processing, will be fed to the loudspeaker.

The receive signal output along lead 157 from hybrid circuit 319 is fed to a 300 Hertz high pass filter 161 and then to a 3 Kilohertz low pass filter 163. High pass filter 161 is formed from an op amp 165, resistors 167, 169, 171 and capacitors 173, 175, 177. Low pass filter 163 is formed from an operational amplifier 191 interconnected as shown with resistors 193, 195, 197, 199, and capacitors 401, 403, 405.

Figure 7:
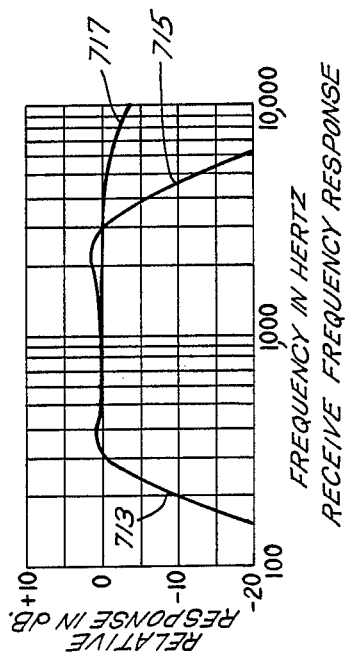
FIG. 7 is a graphical representation of the frequency response of the receive signal of the teleconferencing system embodiment.

An internal switch 411 may be interconnected across resistors 193, 195, 197, as shown, for bypassing the low pass filter to give a broader high frequency response. As shown in FIG. 7, high pass filter 161 filters the signal at the low frequencies 713 to get rid of hum and low frequency interference. Low pass filter 163 filters the received signal at the high frequencies to get rid of high frequency noise as illustrated by the trailing curve 715. Actuation of switch 411 (FIG. 6) serves to broaden the high frequency response as illustrated by curve 717 (FIG. 7), for use with transmission links having a wider frequency response than telephone lines.

The send signal appearing as the output of op amp 143 of hybrid circuit 319 is fed back along lead 221 to a pair of filter circuits 223, 224. Filter circuits 223, 224 are identical to filters 161, 163 so that the send signal undergoes the same frequency response shaping as the received signal. The output of filter 224 is used in the receive signal detection, as described above and in detail hereinafter. As will suggest itself, actuation of switch 411 in low pass filter 163 must also actuate its counterpart switch in filter circuit 224.

Figure 8:
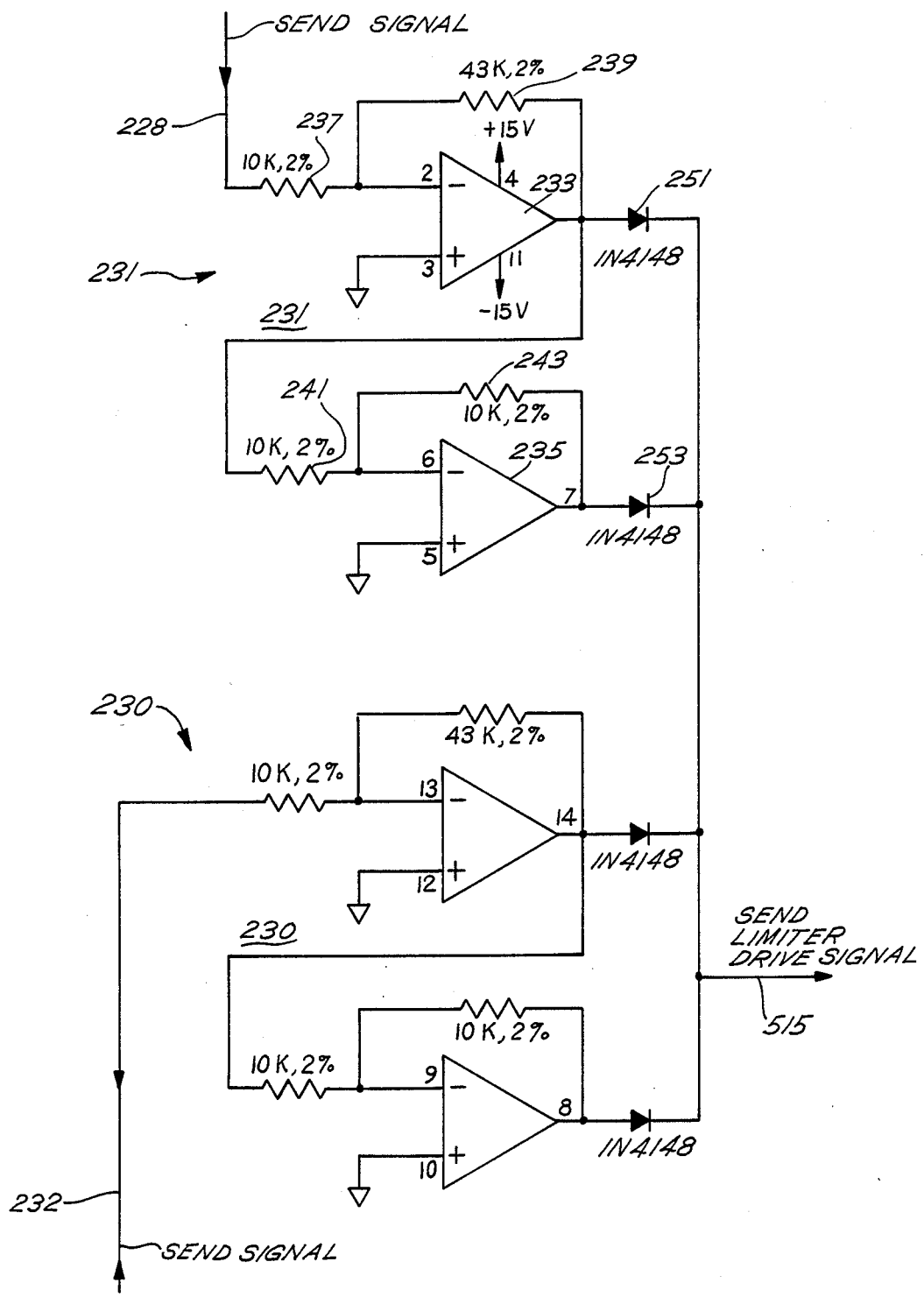
FIG. 8 is a schematic diagram of the limiter sensing circuitry of the teleconferencing system embodiment of FIG. 3A.

Referring to FIG. 8, a full wave detector circuit 231 receives the input/output signal appearing across resistor 83 for detecting the send signal. Full wave detector 231 includes a pair of operational amplifiers 233, 235 interconnected as shown with resistors 237, 239, 241, 243, and diodes 251, 253. Full wave detector 231 serves to rectify the send signal and responsively generate a send limiter drive signal along a conductor 515. The send limited drive signal is used to limit the microphone signal via limiter amplifier 270 and the auxiliary signal via limiter amplifier 360. A second full wave detector 230 identical to the detector 231 is connected via lead 232 to its counterpart resistor 83 in the line interface circuit 363.

The limiter amplifiers 270, 360 each include a photoresistor and light emitting diode (LED). The LEDs are driven by send limiter drive signal on conductor 515 to vary the resistance of the photoresistors. Each photoresistor is connected in the feedback path of a respective op amp for reducing its gain as the light emitting diode is driven by drive signal on conductor 515. The limiting action only acts to reduce the level of excessively strong signals and does not affect gain at normal signal levels.

Figure 9:
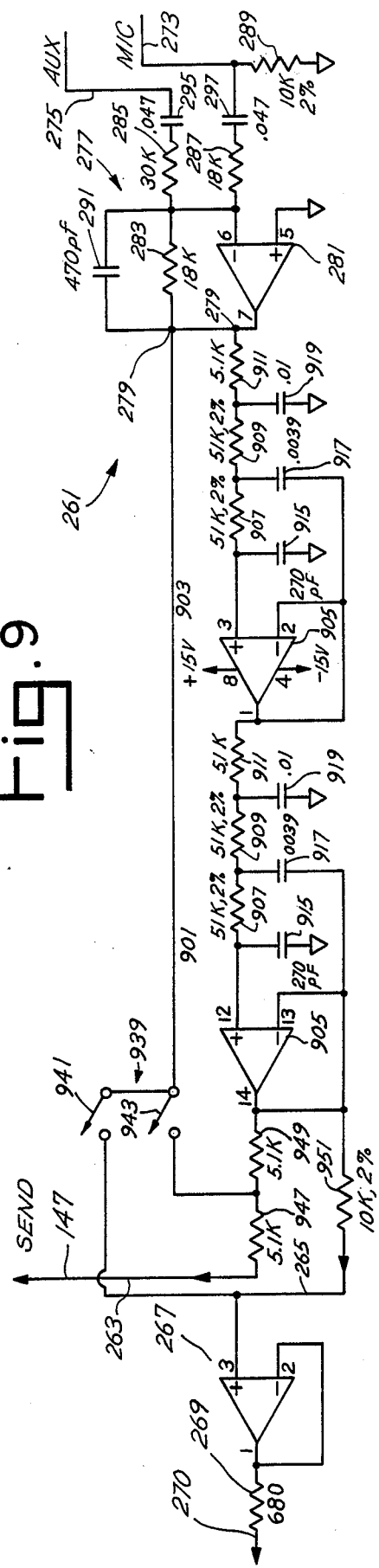
FIG. 9 is a schematic drawing of the send path mixer circuit and low pass filter circuit of the teleconferencing system embodiment of FIG. 3A.

Referring to FIG. 9, mixer 359 (FIG. 3A) and filter 361 (FIG. 3A) are shown in more detail. A mixing/filtering circuit 261 develops the send signal along line 147 for input to hybrid circuit 319 (FIG. 6). An additional send output signal is developed along a line 265 which is fed to a unity gain buffer stage 267 for output through resistor 269 to the interface circuit 363.

As shown in FIG. 9, input line 273 carries the microphone signal, and input line 275 carries the auxiliary signal. The microphone signal and the auxiliary signal appearing along leads 273, 275 enter a mixing amplifier 277 where the two input signals are mixed and combined as a signal output at node 279.

The mixing amplifier includes an op amp 281, resistors 283, 285, 287, 289 and capacitors 291, 295 and 297.

The combined signal output is fed into two identical frequency response shaping low pass filters 901, 903 which are connected in series. Each of the low pass filters include an op amp 905 connected as shown with resistors 907, 909, 911 and capacitors 915, 917, 919.

Figure 10:
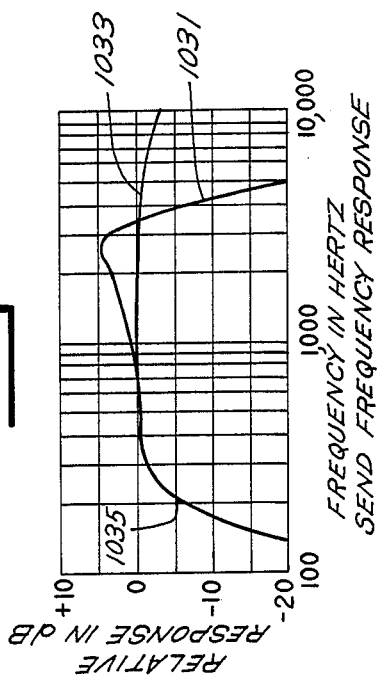
FIG. 10 is a graphical representation of the frequency response of the send signal of the teleconferencing system embodiment of FIG. 3A.

Referring to FIG. 10, the frequency response of the send signal is illustrated. The two series connected low pass filters 901, 903 (FIG. 9) provide shaping to curve 1031 of the repsonse illustrated in FIG. 10. In order to allow for wider band width systems as discussed above, a curve 1033 may be generated by bypassing the series connected low pass filters 901, 903. The low frequency response shaping 1035 is performed primarily by high pass filter 362 for microphone signals and high pass filter 360 for the auxiliary signal.

Referring to FIG. 9, a switch 939 connects node 279 to the send output line 263 via resistor 947, for bypassing low pass filters 901, 903. Switch 939 provides a wide band bypass of the low pass filters. As shown, switch 939 includes a pair of wipers 941, 943 which are actuable independently of one another. Thus, send output line 263 could be a narrow band while send output line 265 is wide band. The switch 939 is preferably an internal switch rather than freely accessible for operator control.

The output of low pass filter 901 is fed onto send oitput line 263 via a pair of resistors 947, 949. Switch swiper 943 serves to connect the output of mixing amplifier 277 to the node between resistors 947, 949 as shown. The output of low pass filter 901 is also connected to the send output line 265 via a resistor 951. Switch wiper 941 of the switch 939 serves to bypass resistor 951, connecting the output of mixing amplifier 277 directly to the unity gain buffer stage 267.

Figure 11:
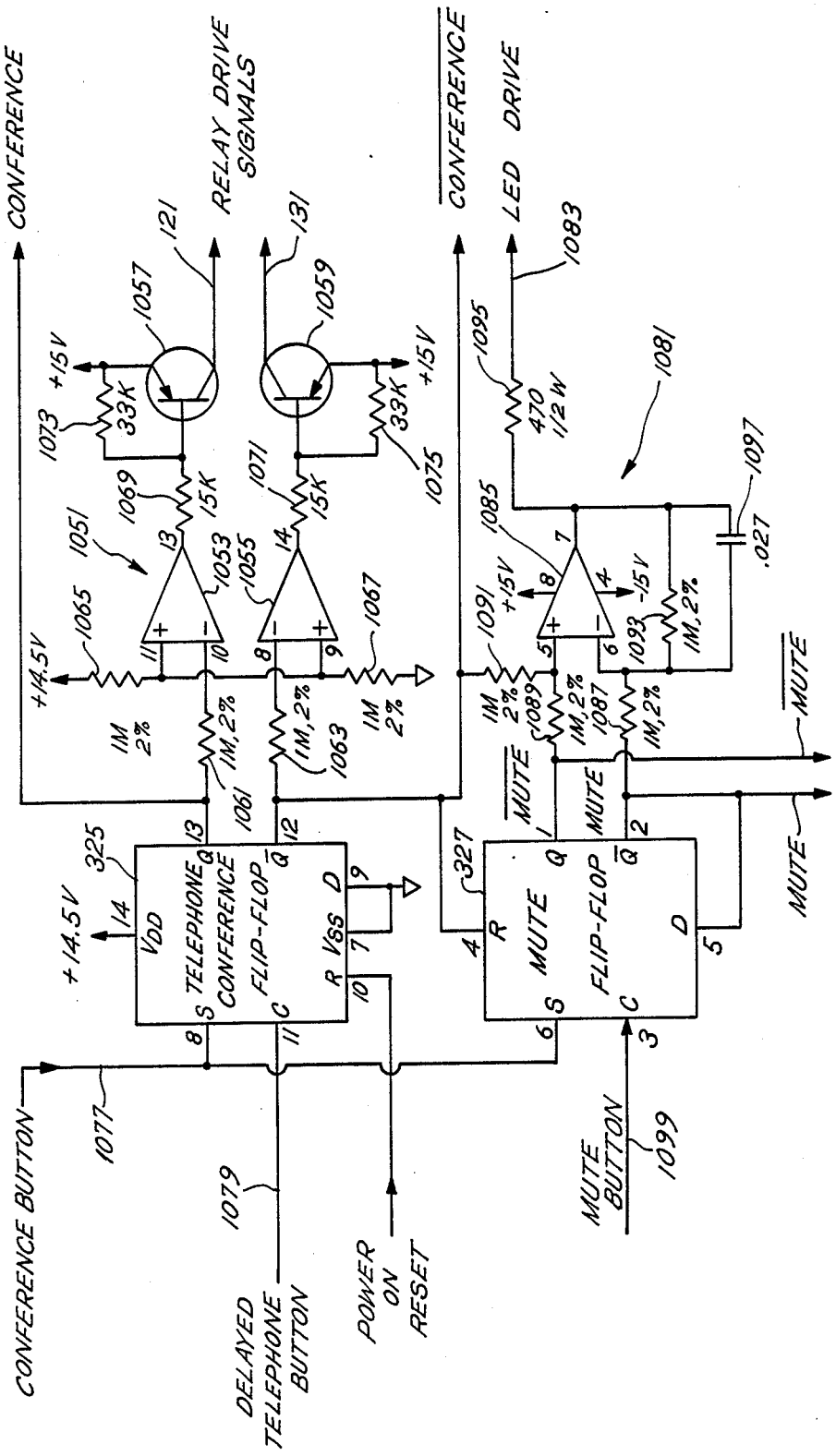
FIG. 11 is a schematic diagram of the CONFERENCE flip flop and MUTE flip flop of the teleconferencing system embodiment of FIG. 3B.

Referring to FIG. 11, CONFERENCE flip flop 325 is illustrated in more detail. The Q output of CONFERENCE flip flop 325 generates a conference signal for indicating the conference mode when the Q output is at a logic high value; $\overline{Q}$ is at a logic high value when in the telephone mode (CONFERENCE). The output of CONFERENCE flip flop 325 controls a relay drive circuit 1051 which generates relay drive signals on conductors 121, 131 as described in reference to FIG. 5. Relay drive circuit 1051 is constructed from a pair of comparators 1053, 1055 which are respectively responsive to the Q and $\overline{Q}$ outputs of CONFERENCE flip flop 325 for generating the drive signals via respective transistors 1057, 1059. The comparators 1053, 1055 and transistors 1057, 1059 are interconnected together with resistors 1061-1075, as shown.

CONFERENCE flip flop 325 is set in accordance with a conference button signal appearing on conductor 1077, and is reset in accordance with a delayed telephone button signal appearing on conductor 1079. The conference button signal and the delayed telephone button signal are developed by control logic 323 (FIG. 3A) as described in more detail with respect to FIG. 12.

FIG. 11 also illustrates MUTE flip flop 327 in detail. The MUTE flip flop 327 is set in accordance with conference button signal appearing on conductor 1077 and a mute button signal appearing on conductor 1099. Actuation of the conference button on control 29 serves to place flip flop 327 in the non-muted mode; actuation of the mute button on control 29 serves to switch flip flop 327 between its mute and non-muted mode.

The outputs of MUTE flip flop 327 and the conference output of flip flop 325 control and LED drive circuit 1081 for generating an LED drive signal along conductor 1083, to actuate the conference and mute indicators on the remote control 29. A positive voltage lights on indicator, and the other indicator lights on a negative voltage. LED drive circuitry 1081 is constructed from an op amp 1085, resistors 1087-1095 and capacitor 1097, connected as shown.

Figure 12:
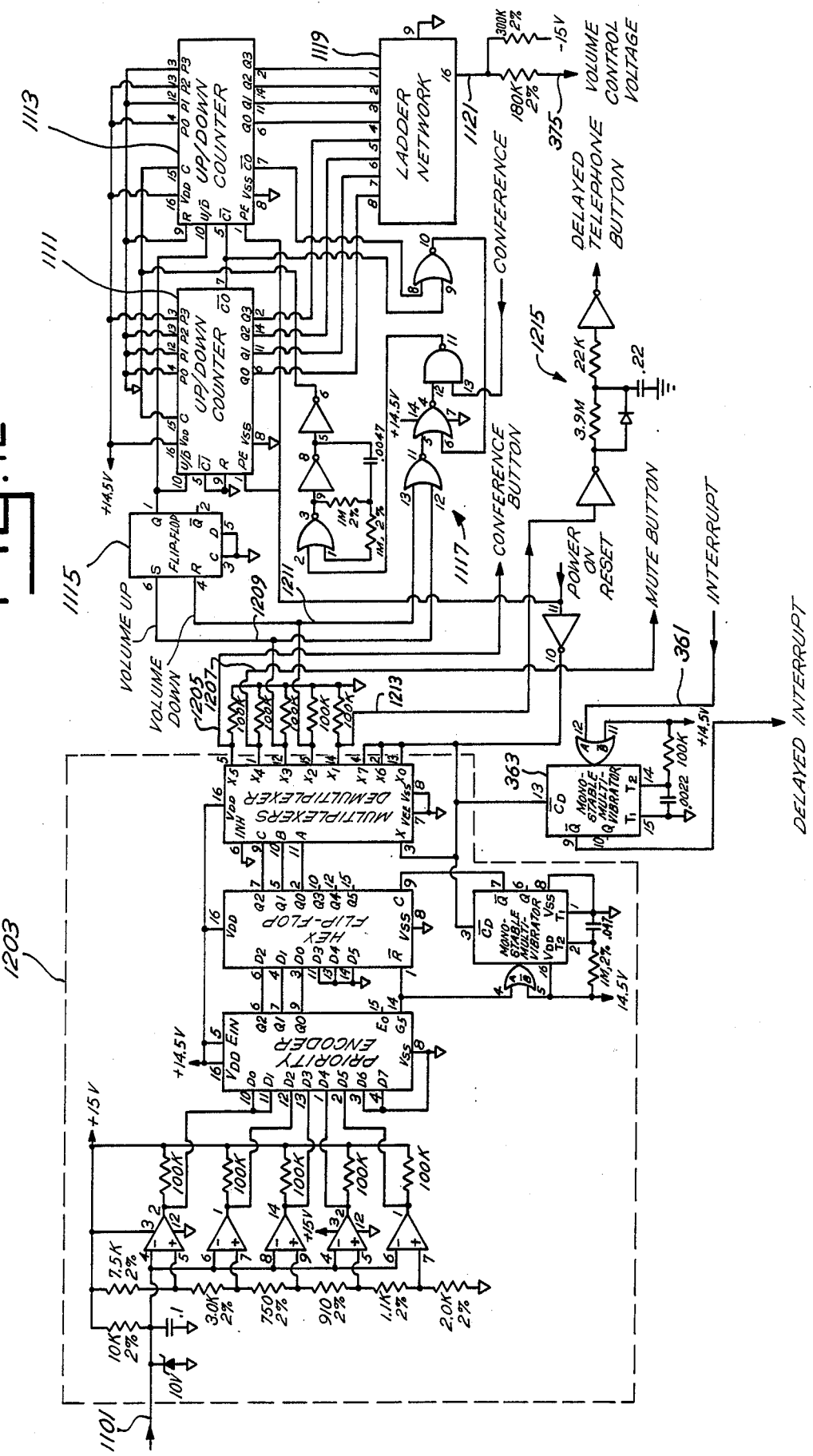
FIG. 12 is a schematic drawing of the control logic and volume control voltage generator of the teleconferencing system embodiment of FIG. 3A.

Referring to FIG. 12, control logic 323 (FIG. 3A) and voltage generator 329 are illustrated in detail. Input from remote control 29 appears along conductor 1101 for processing by a voltage decoding network 1203. The voltage level appearing on conductor 1101 is one of five voltage levels when one of the five remote control buttons is prssed. Each button loads conductor 1101 to ground through a different resistance for developing the input voltage. Decoding network 1103 develops a logic high signal at one of five output conductors 1205, 1207, 1209, 1211, 1213 depending upon the button pressed. As will suggest itself, circuit 1203 may be formed in many different ways.

Conductor 1205 is high when the conference button is pressed. Conductor 1207 is high when the mute button is pressed. Conductor 1209 is high when the volume up button is pressed. Conductor 1211 is high when the volume down button is pressed. Conductor 1213 is high when the telphone button is pressed.

Circuit 1215 serves as a delay for requiring the telephone button to be depressed for one second before transfer to a telephone can take place to prevent inadvertent disconnection.

The volume up conductor 1209, when high, serves to actuate counters 1111, 1113 for counting up to develop a digital output count to ladder network 1119 which generates an analog voltage onto conductor 1121. The volume down conductor 1211, when high, causes down counting by counters 1111, 1113. As will suggest itself, other means may be utilized for generating a voltage control signal on conductor 375 in response to operator control, as for example, a potentiometer.

FIG. 12 also shows one-shot 363 in more detail. Interrupt sensing circuit 359 (FIG. 3B) generates an interrupt signal along conductor 361 (FIG. 11) for input to monostable multivibrator 363 for generation of a send clock signal for clocking send flip flop 351 (FIG. 12).

Figure 13:
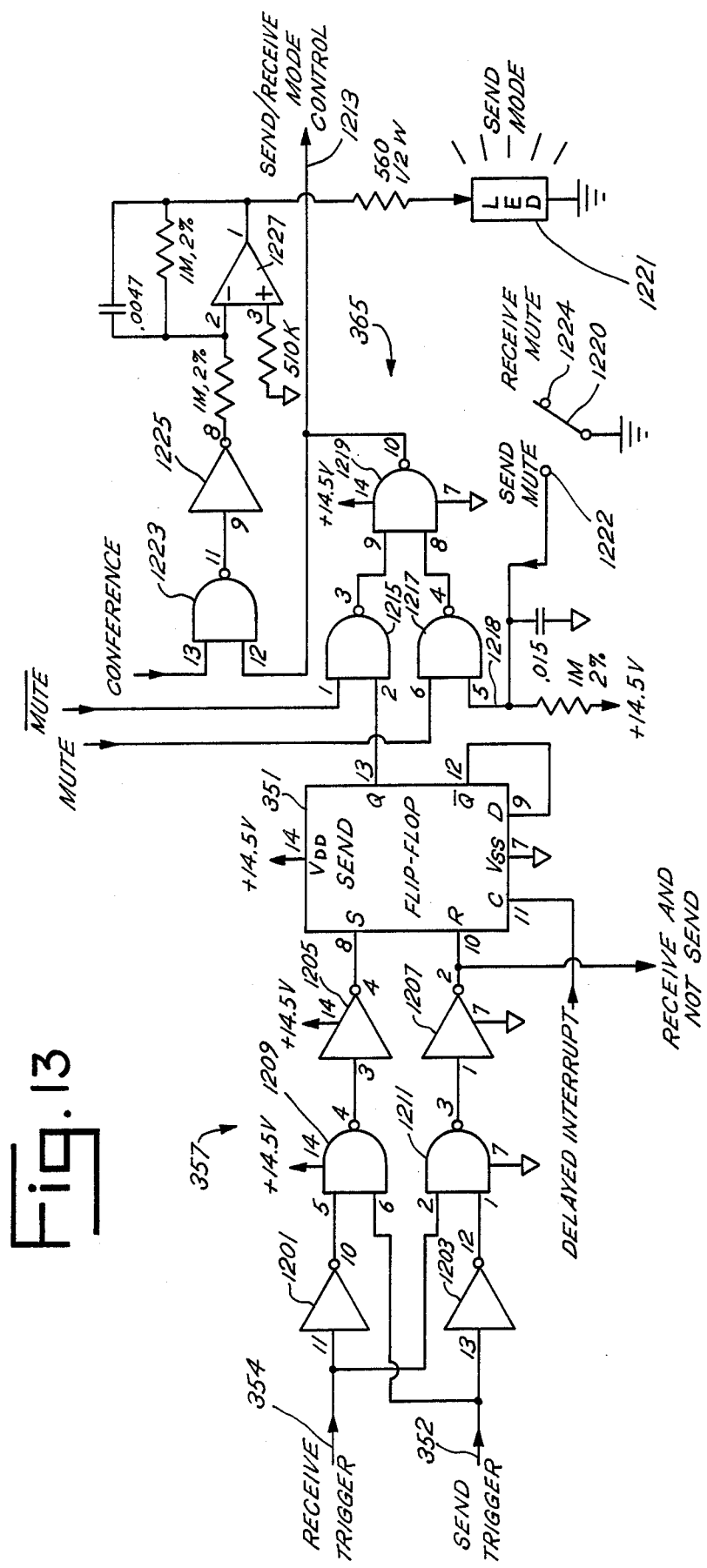
FIG. 13 is a schematic drawing of the send flip flop and associated circuitry of the teleconferencing system embodiment of FIG. 3B.

Referring to FIG. 13, SEND flip flop 351 is shown in more detail. Logic circuitry 357 receives the receive trigger and the send trigger along respective conductors 354, 352. Logic circuit 357 is constructed from inverters 1201-1207 and NAND gates 1209, 1211, connected as shown. Logic circuit 357 serves to set and reset SEND flip flop 351 in accordance with the receive trigger signal and the send trigger signal. The output of inverter 1207 generates a receive-and-not-send signal which is fed to send sensing threshold circuit 401 (FIG. 3B) and receive compressor circuit 383.

The Q output of send flip flop 351 is input to logic circuit 365. The output of logic circuit 365 appears along a conductor 1213 which is passed to gate circuit 367 (FIG. 3B). Three NAND gates 1215-1219 receive the Q output of send flip flop 351 together with the mute signal and a mute mode control signal (at 1218). When the system is not muted, the Q output of SEND flip flop 351 appears on conductor 1213. When the system is muted, the logic signal appearing on conductor 1213 is independent of the Q output of the SEND flip flop and depends on the position of send/receive mute switch 1220. When switch 1220 is in the send mute position 1222, the output on conductor 1213 is in the receive mode; when switch 1220 is in the receive mute position 1224, the output on conductor 1213 is in the send mode. Thus, actuation of the mute button on remote control 29 locks the system in send or receive mode depending on the position of switch 1220.

An LED 1221 is lit whenever the system is in its send mode. The send signal appearing on conductor 1213 is fed through NAND gate 1223, inverter 1225 and op amp 1227 for driving LED 1221. NAND gate 1223 also receive the CONFERENCE signal for permitting LED 1221 to light only when the system is in the conference mode.

Figure 14:
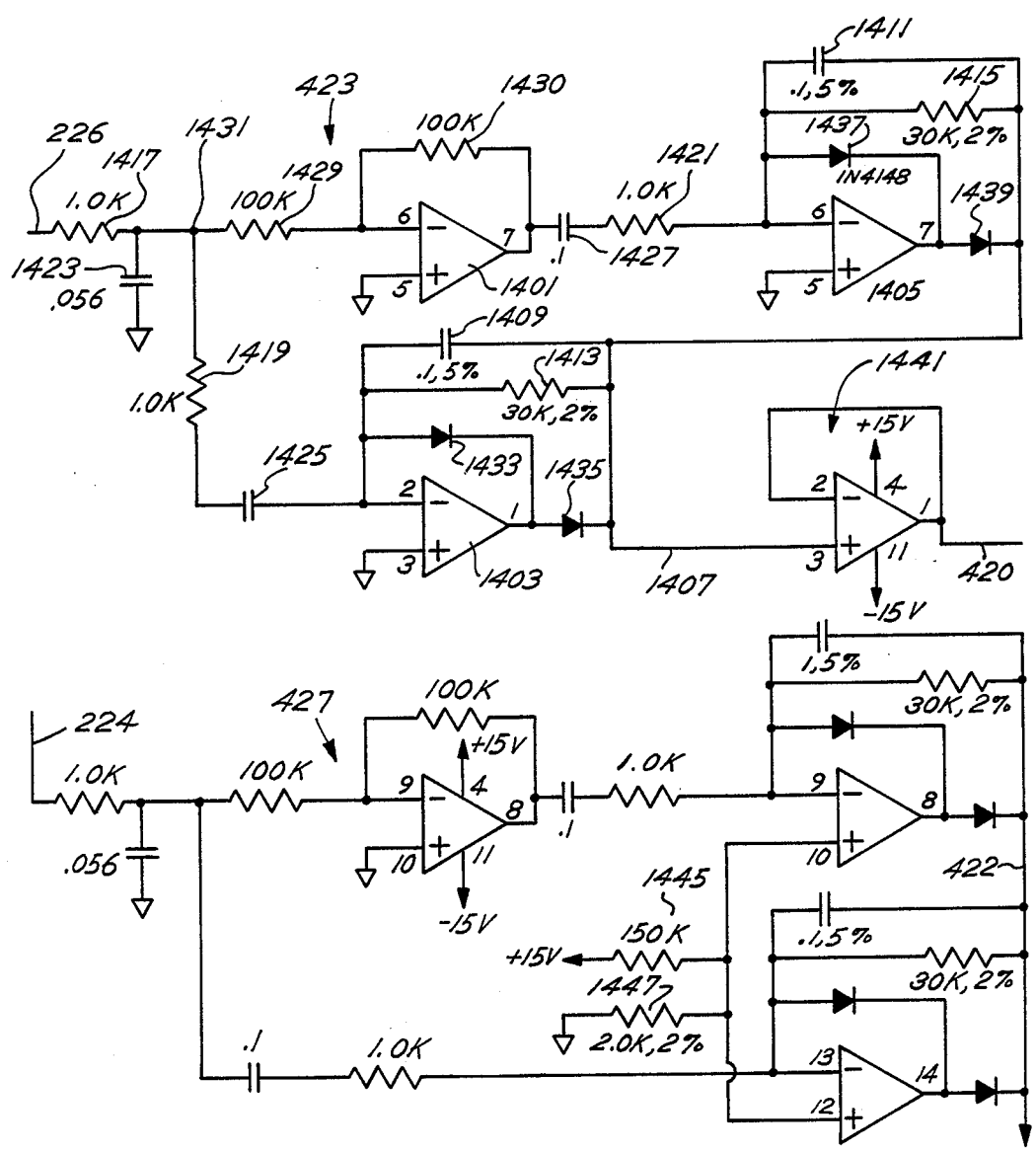
FIG. 14 is a schematic diagram of the full wave rectifier/low pass filters of the teleconferencing system of FIG. 3B.

Full wave rectifier/low pass filters 423, 427 (FIG. 3B) are shown in detail in FIG. 14. Full wave rectifier/low pass filter 423 receives the bandpass filtered receive signal at input 226. Three operational amplifiers 1401, 1403, 1405 are interconnected as shown for generating a rectified filtered signal along conductor 1407. Resistors 1417, 1419, 1421 and capacitors 1423, 1425, 1427 provide some additional band pass frequency shaping. Op amp 1401 is connected with resistors 1429, 1430 for forming an inverting circuit which provides an exact inversion of the signal at node 1431. Op amp 1403, together with diodes 1433, 1435, form a half wave rectifier; similarly, op amp 1405, together with diodes 1437, 1439 form a half wave rectifier. The two half wave rectifiers are driven by equal but inverted signals which appear rectified and combined at their outputs to form a precision full wave rectified signal appearing along conductor 1407. Resistor 1413 an capacitor 1409 and resistor 1415 and capacitor 1411 provide a three millisecond low pass filter time constant. Full wave rectifier 1427 is identical to the full wave rectifier 423 as just described in detail except for a small 0.2 volt offset voltage placed on its output by the action of resistors 1445 and 1447 for reasons previously described.

Conductor 1407 is connected to buffer stage 1441 which serves as a buffer for the signal appearing on conductor 1407 and applies this signal to conductor 420.

Figure 15:
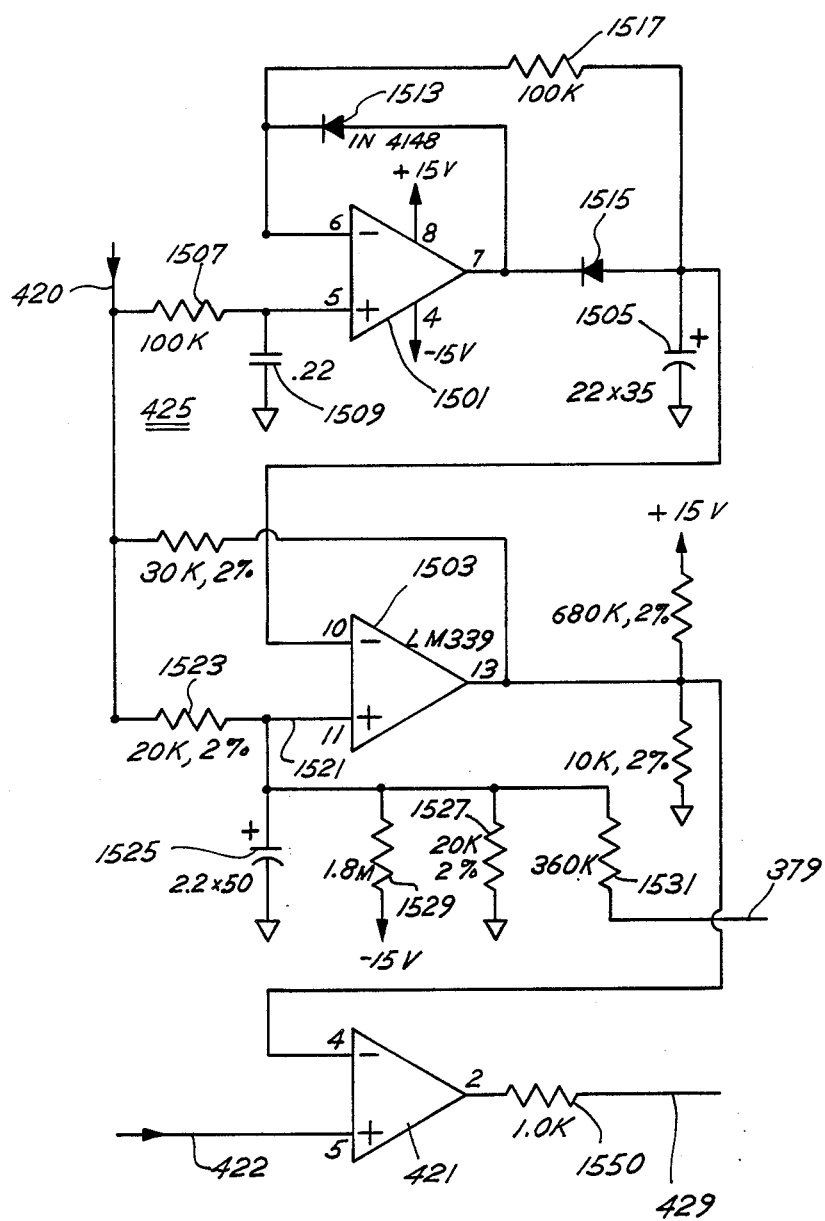
FIG. 15 is a schematic diagram of the noise adapting threshold circuit and associated comparator of the teleconferencing system embodiment of FIG. 3B.

Referring to FIG. 15, noise adapting threshold circuit 425 is formed from operational amplifier 1501 and comparator 1503. Op amp 1501 receives the output of buffer stage 1441 appearing on conductor 420 (FIG. 14) for generating a voltage level across capacitor 1505 which is proportional to any steady background noise which may appear in the input signal. Resistor 1507 and capacitor 1509 form an additional 22 millisecond low pass filter time constant to further smooth the signal appearing on conductor 420 before applying this signal to the non-inverting input of op amp 1501. The action of op amp 1501, together with diodes 1513, 1515 and resistor 1517, is such that the voltage appearing across capacitor 1505 will charge positively towards a higher voltage appearing across capacitor 1509 with a 2.2 second time constant. A falling voltage across capacitor 1509 which is not greater than the voltage across capacitor 505 will immediately discharge capacitor 1505 to the same voltage.

The voltage across capacitor 1505 will rise to the level of a steady signal appearing on conductor 420. More rapidly varying levels appearing on conductor 420 from received speech will not have time to cause a significant increase in the voltage across capacitor 1505 between the normal pauses in speech, at which times the voltage quickly returns to the steady background level. As a result, the voltage across capacitor 1505 will track the residual background noise level present at conductor 420 even in the presence of speech signals.

Comparator 1503 receives the voltage across capacitor 1505 as a threshold voltage for comparison with a voltage appearing at its non-inverting input 1521. The level indicating signal appearing on conductor 420 is fed to conductor 1521 through a resistor 1523 which, in conjunction with a capacitor 1525 and with resistor 1527, forms a 22 millisecond low pass filter time constant. Resistor 1529 provides a small offset voltage at conductor 1521 to provide a minimum threshold in the absence of voltage across capacitor 1505. The threshold level provided by resistor 1529 is modified slightly by the receive compression control voltage fed through resistor 1531 from conductor 379.

The open collector output transistor of comparator 1503 turns off when the voltage at conductor 1521 exceeds the voltage across capacitor 1505. This occurs when the voltage on conductor 420, applied through resistor 1523 to conductor 1521, is sufficient to overcome the offset previously described and overcome the voltage across capacitor 1505 by at least a factor of 2 (6 dB). This allows the signal at 420 to be applied with appropriate scaling to the inverting input of comparator 421. Comparator 421 compares the voltage at its inverting input with the output of full wave rectifier/low pass filter 427 appearing along conductor 422 at its non-inverting input. A valid receive sensing in indicated by the turning on of the open collector output transistor of comparator 421, shorting its output to ground. The output of comparator 421 passes through a resistor 1550 and on to conductor 429 for indicating sensing of receive signal.

Figure 16:
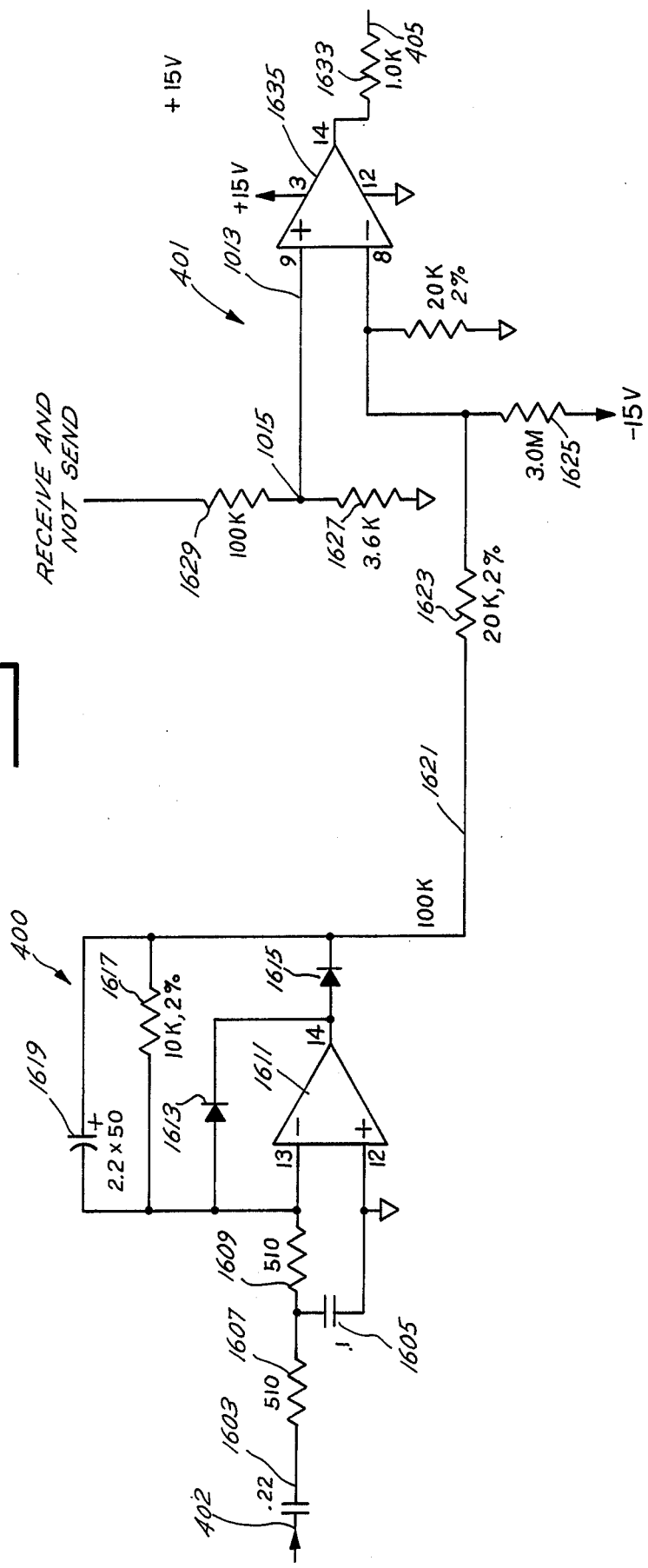
FIG. 16 is a schematic diagram of the half wave rectifier/low pass filter and associated comparator of the teleconferencing system embodiment of FIG. 3B.

Referring to FIG. 16, half wave rectifier/low pass filter 400 and comparator 401 are shown in more detail in FIG. 16. The combined gated microphone signal, after passing through amplifier limiter 360 and high pass filter 362 appears along conductor 402 for input to half wave rectifier/low pass filter 400. Capacitors 1603, 1605 and resistors 1607, 1609 provide some additional band pass frequency shaping. Op amp 1611, together with diodes 1613, 1615 form a half wave rectifier. Resistor 1617 and capacitor 1619 provide a 22 millisecond low pass filter time constant. Thus, a filtered half wave rectified signal appears along conductor 1621 indicating the level of the combined gated microphone signals.

The signal appearing on conductor 1621 is fed to the inverting input of comparator 1635 through a resistor 1623. A resistor 1625 also provides an offset voltage level to the inverting input of comparator 1635. Under most conditions, the non-inverting input of comparator 1635 is at ground potential. A send sense, indicated by the turning on of the open collector out put transistor of comparator 1635, occurs when the signal level appearing on conductor 1621 applied through resistor 1623 overcomes the offset applied through resistor 1625. The output of comparator 1635 passes through resistor 1633 and on to conductor 405 for indicating sensing of a send signal.

When a receive-and-not-send signal is applied across series connected resistors 1627, 1629, a positive voltage is developed at the non-inverting input of comparator 1635. This raises the necessary threshold voltage to be overcome as described previously.

Figure 17:
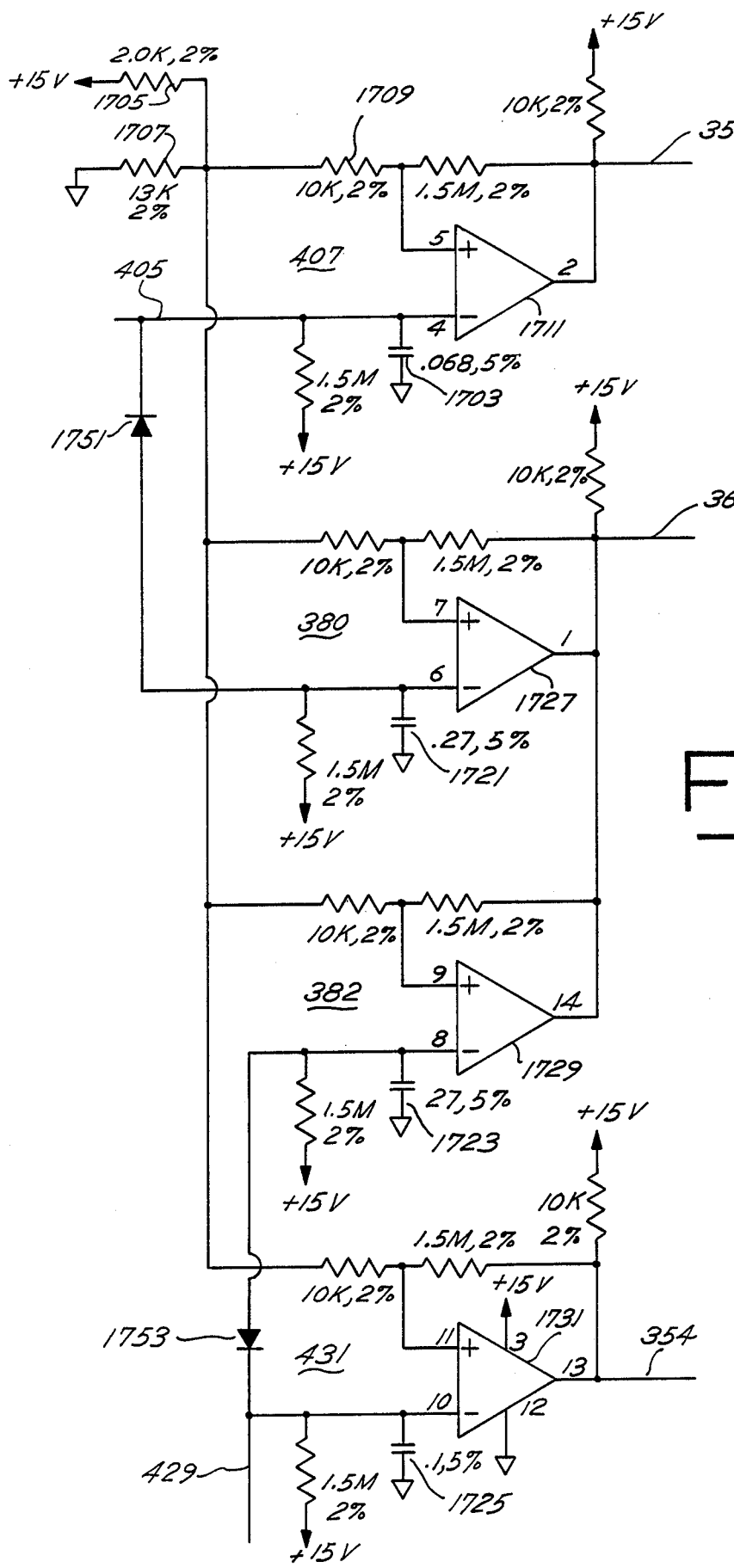
FIG. 17 is a schematic diagram of the four retriggerable one-shots of the teleconferencing system embodiment of FIG. 3B.

Referring to FIG. 17, retriggerable one-shots 407, 431, 380 and 382 are shown in more detail. Particularly, one-shot 407 receives the output of comparator 401 along conductor 405. When a send sense occurs, the output of comparator 1635 (FIG. 16) is pulled to ground, causing discharge of capacitor 1703. Resistors 1705, 1707 provide a 13 volt reference which is applied to the non-inverting input of comparator 1711 via resistor 1709. The discharge of capacitor 1703 causes comparator 1711 to develop a logic high output along conductor 352 (send trigger) until capacitor 1703 is recharged to 13 volts (0.2 seconds).

One-shots 380, 382, 431 are designed similarly to oneshot 407. Capacitors 1721, 1723, 1725 provide for respective recharge times of 0.8 seconds, 0.8 seconds, and 0.3 seconds. Diodes 1751, 1753 permit capacitors 1703, 1725 to recharge more rapidly than capacitor 1721, 1723.

The open collector outputs of comparators 1727, 1729 are wired together to form a logical AND such that an interrupt output appears on lead 361 only when both one-shots 380, 382 have recently triggered, as previously described with respect to FIG. 3B.

Figure 18:
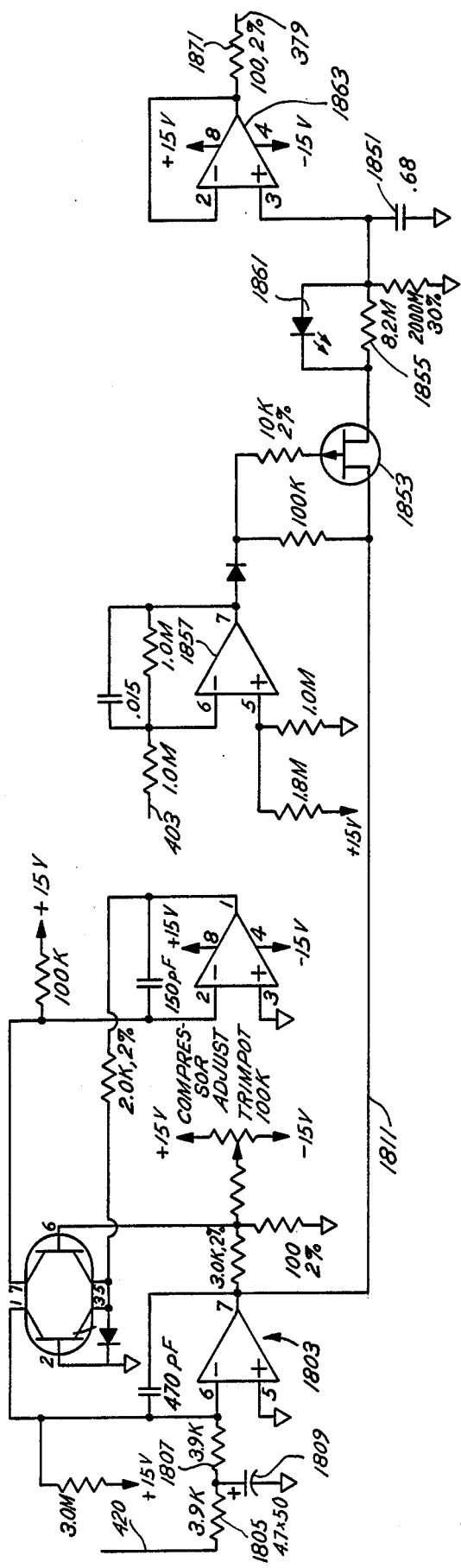
FIG. 18 is a schematic diagram of the receive compressor circuit of the teleconferencing system embodiment of FIG. 3B.

Referring to FIG. 18, receive compressor circuit 383 is shown in more detail. The level of the receive signal appearing on conductor 420 (FIG. 14) is input to a logarithmic converter 1803. Additional low pass filtering is provided by resistors 1805, 1807 and capacitor 1809. The output of logarithmic converter 1803 appears along conductor 1811 with a scale factor of −0.9 volts per 10 dB change in the input signal level appearing on conductor 420. Logarithmic converter 1803 is a conventional logarithmic converter circuit having components and interconnections as shown. The signal appearing on conductor 1811 is applied across a capacitor 1851 after passing through a FET switch 1853 and a resistor 1855. An op amp 1857 and associated components, as shown, monitors the receive-and-not-send signal appearing along conductor 403 for controlling FET switch 1853. FET switch 1853 is switched on when the receive-and-not-send signal is at a logic high state. Thus, the voltage appearing across capacitor 1851 is updated only when a receive signal is present without a send signal. Resistor 1855 and capacitor 1851 form a time constant of 5.5 seconds, resulting in a slow adaption to the average receive signal levels but not to any send contamination in the receive signal. LED 1861 causes rapid adaptation to large increases in receive signal level. The field effect transistor input op amp 1863 (TLO72) buffers the voltage level appearing across capacitor 1851 for output onto conductor 379 via resistor 1871.

As described hereinafter in conjunction with FIGS. 19 and 20, a one volt change in the voltge appearing on conductor 379 will result in a 10 dB change in the gain of variable gain amplifier 333 when the system is in the receive mode. In conjunction with the scale factor of logarithmic converter 1803, a 10 dB change in average incoming receive level will cause a compensating 9 dB change in the gain of 333, resulting in only a 1 dB change in average level as heard through loudspeaker 13.

Figure 19:
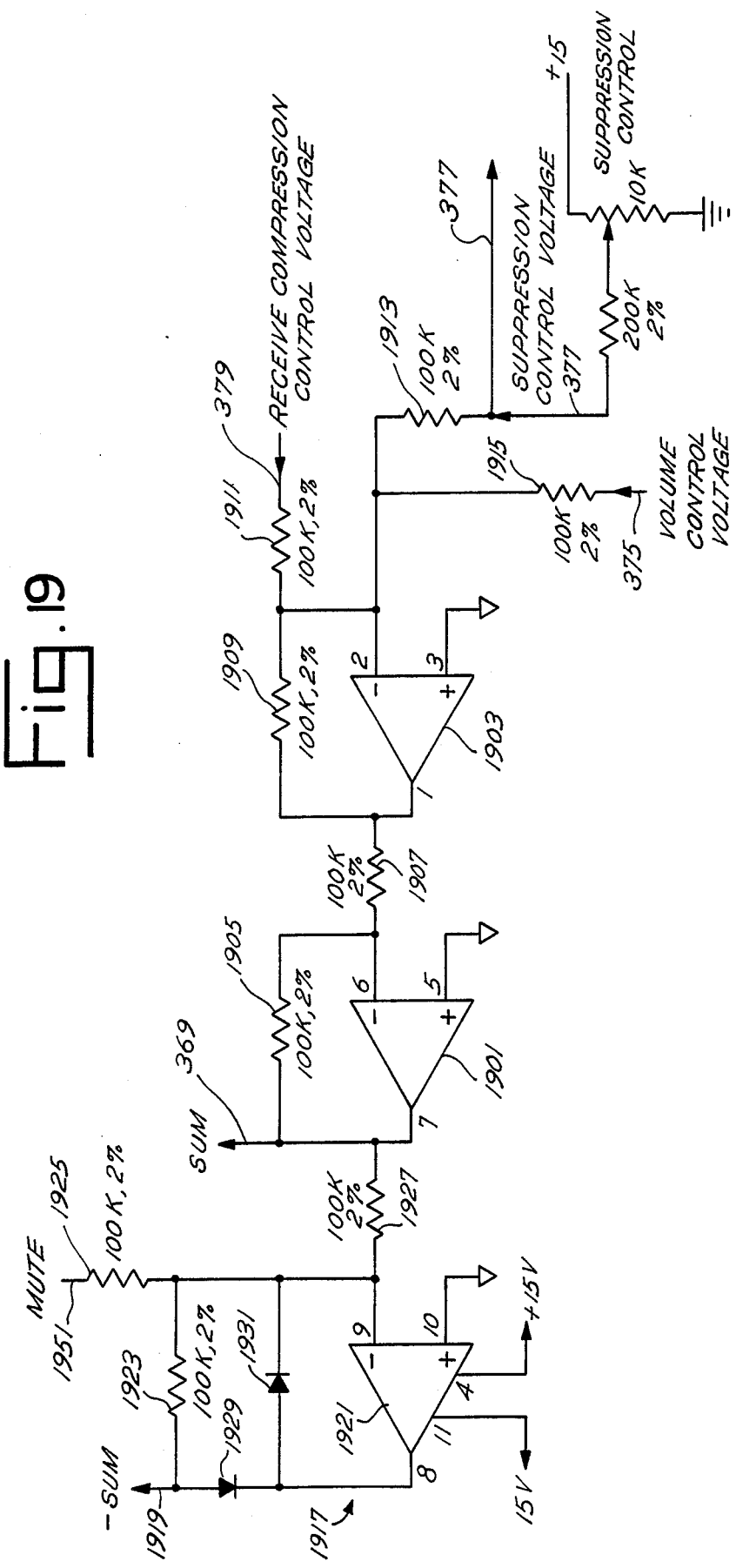
FIG. 19 is a schematic diagram of the voltage summer circuit of the teleconferencing system embodiment of FIG. 3B.

Referring to FIG. 19, voltage summer circuit 373 is illustrated in detail. Voltage summer circuit 373 effectively adds the volume control voltage on conductor 375, the suppression control voltage on conductor 377 and the receive compression control voltage on conductor 379, generating a SUM signal along conductor 369. The control voltages on conductors 375, 377, 379 will be processed by voltage summer circuit 373 and exponential control current generators 371 such that one volt changes in any of the three control voltages will result in 10 dB gain changes in the appropriate send and/or receive path. Summer circuit 373 is constructed from operational amplifiers 1901, 1903 connected with resistors 1905-1915, as shown. An inverting stage 1917 receives the SUM signal on conductor 369 for generating a −SUM signal on conductor 1919. Inverting stage 1917 is constructed from an op amp 1921 connected with resistors 1923, 1927 and diodes 1929, 1931. Diodes 1929, 1931 prevent the −SUM signal from ever going positive under any operating conditions.

Figure 20:
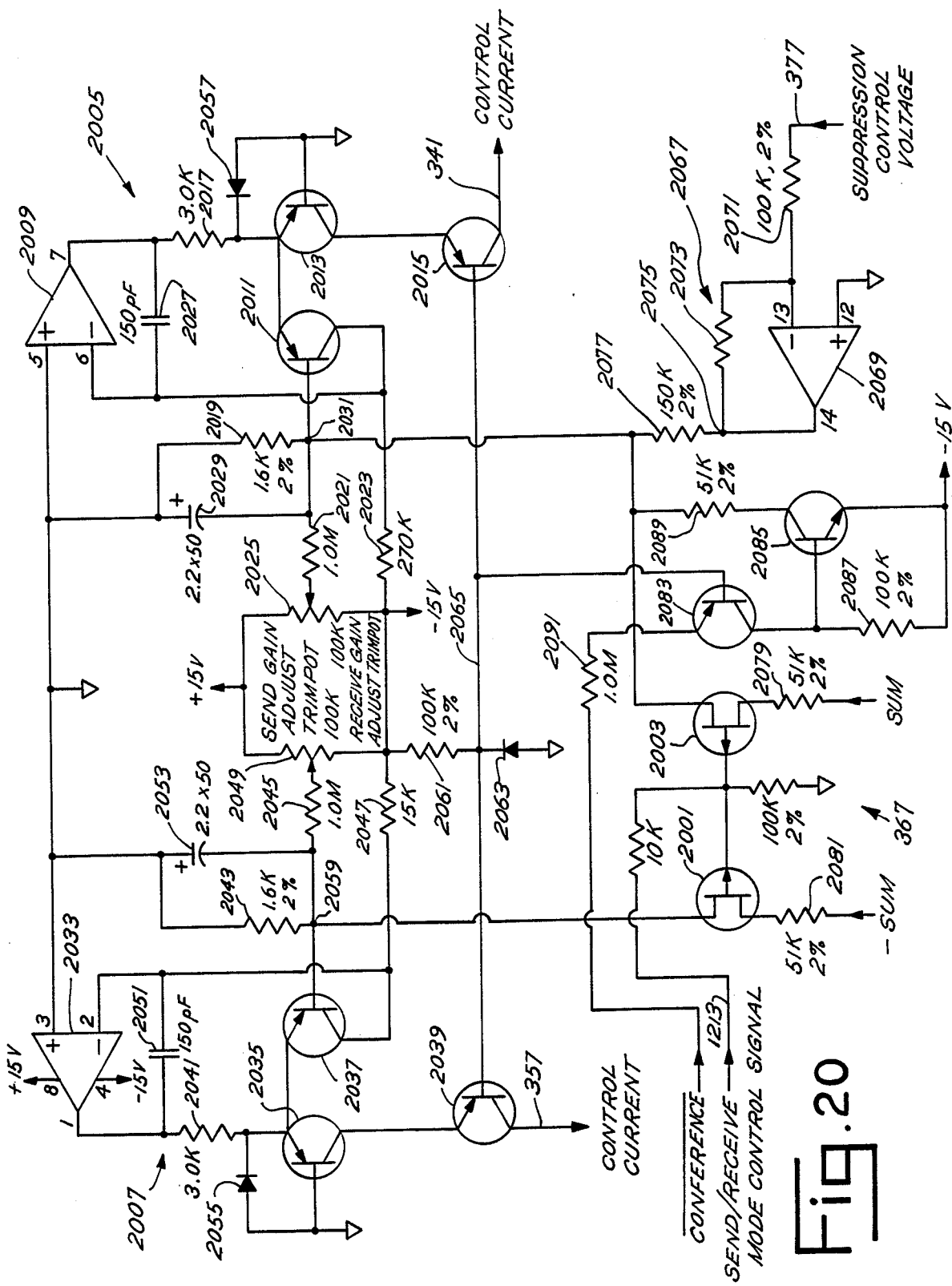
FIG. 20 is a schematic diagram of the exponential control current generators of the teleconferencing system of FIG. 3B.

Referring to FIG. 20, exponential control current generators 371 and switching circuit 367 are shown in detail. Switching circuit 367 is controlled by the send-/receive mode control signal along conductor 1213. Switching circuit 367 is formed from a pair of FETs 2001, 2003 which control the transfer of the SUM and −SUM control signals to a receive control current generator 2005 and a send control current generator 2007, respectively. When the send/receive mode control signal on conductor 1213 is high (representing the send mode), the FETs 2001, 2003 are off, blocking transfer of the SUM and −SUM signals. When the send/receive mode control signal on conductor 1213 is low (indicating receive mode), FETs 2001, 2003 transfer the SUM and −SUM signals to their respective control current generators.

Current generators 2005, 2007 form the exponential control current generators 371, as described previously with respect to FIG. 3B. Current generators 2005, 2007 are of conventional exponential converter design. Current generator 2005 is constructed from op amp 2009 connected to transistors 2011, 2013, 2015, resistors 2017-2025, capacitors 2027, 2029, diode 2057. The SUM signal is input at node 2031 and the output control current appears along conductor 341.

Current generator 2007 is constructed in a similar fashion from op amp 2033 connected with transistors 2035, 2037, 2039, resistors 2041-2049, capacitors 2051, 2053, diode 2055. The −SUM signal is input at node 2059 and the output control current is developed along conductor 357. Resistor 2061 and a diode 2063 provide proper bias voltage for the three transistors having their bases connected to conductor 2065. Capacitors 2053 and 2029 slow voltage changes at nodes 2059 and 2031, respectively, to slightly reduce the abruptness of send-/receive direction switching, avoiding click sounds.

The suppression control voltage appearing on conductor 377 is also applied to an inverter stage 2067 consisting of op amp 2069 and resistors 2071, 2073. The voltage appearing at output node 2075 of the inverter is the inverted voltage on 377 amplified by three times it value. The output signal at node 2075 is applied to node 2031 of generator 2005 via a resistor 2077. The SUM signal is also fed to node 2031 via a resistor 2079, but only when the system is in the receive mode. The −SUM signal is fed to node 2059 of generator 2007 via resistor 2081 also only in the receive mode.

The result of the applications of these control signals to nodes 2059 and 2031 is the desired send/receive gains which maintain proper control over system operation and feedback loop gains as described previously. In the send mode, the send path gain is at a nominal setting. In the send mode, the receive path gain is at a nominal setting less the preset suppression value. In the receive mode, the send gain is at its nominal gain setting less the sum of the preset suppression value, the user operated volume control value and the auomatic receive compression value. In the receive mode, the receive gain is at its nominal gain setting plus the sum of the user adjusted volume control value and automatic receive compression value. In this later mode the effect of the suppression control voltage on conductor 377 applied to control current generator 2005 through inverter circuit 2067 is cancelled by the application to 2005 of the noninverted suppression control signal contained in the SUM signal through FET switch 2003.

A conference signal (representing telephone mode when the signal is high) is fed to a pair of transistors 2083, 2085 interconnected with resistors 2087, 2089, 2091 as shown. In the telephone mode, transistors 2083, 2085 are turned on applying a strong control current reducing signal to node 2031 ensuring turn off of loudspeaker 13.

Referring again to FIG. 19, the mute signal from MUTE flip flop 327 is applied to conductor 1951 for forcing the −SUM signal strongly negative during the mute mode. When in the send mute mode (locked in receive), the strongly negative −SUM signal is applied to node 2059 of generator 2007 for totally attenuating the outgoing send signal. This allows private local conversation when in the send mute mode.

Figure 21:
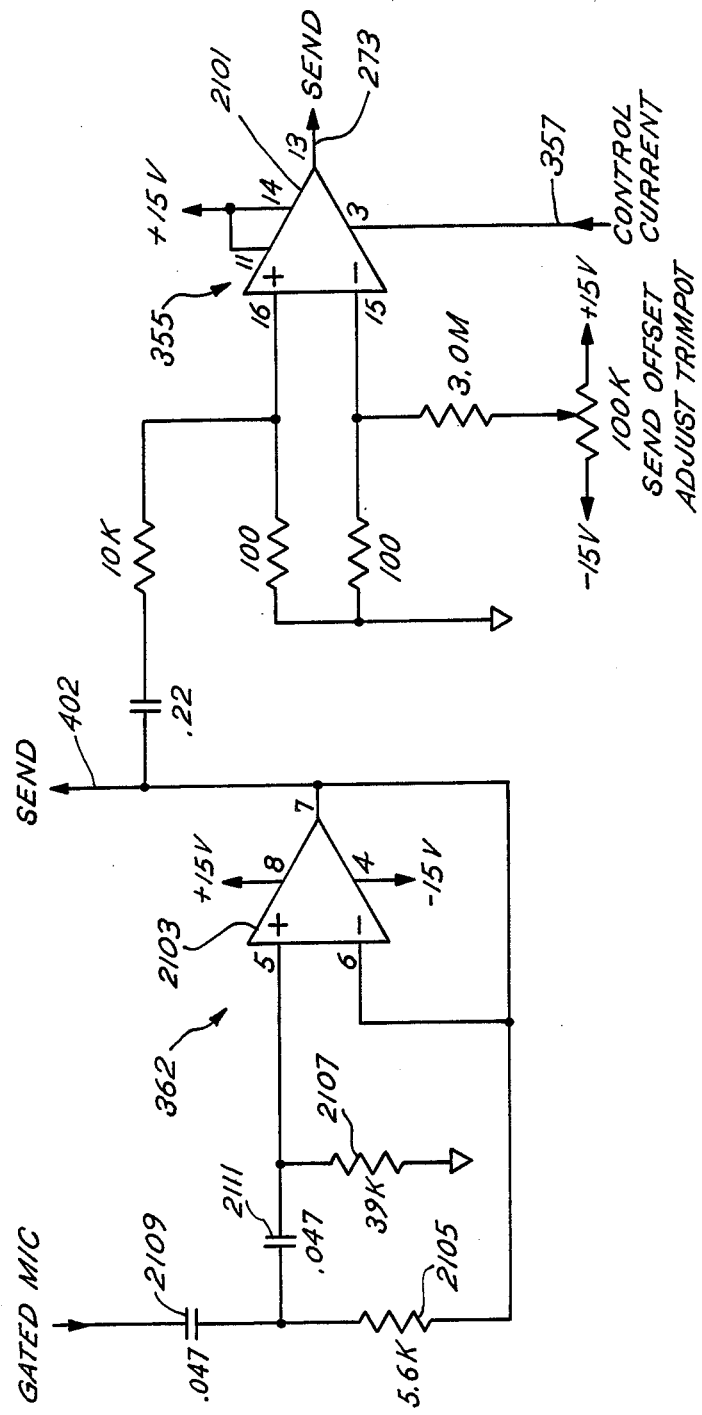
FIG. 21 is a schematic diagram of the send path high pass filter and control amplifier of the teleconferencing system of FIG. 3A.
Figure 22:
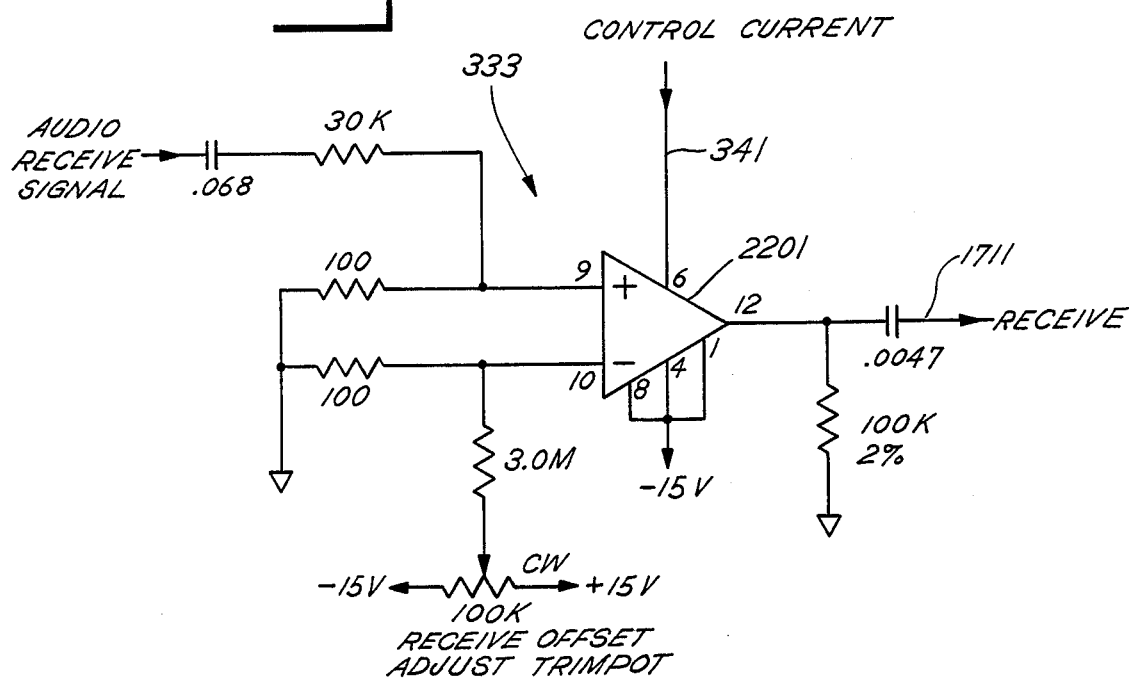
FIG. 22 is a schematic diagram of the receive control amplifier of the teleconferencing system of FIG. 3A.

Control amplifiers 335, 333 are illustrated in more detail in FIGS. 21, 22. The control amplifiers are formed from variable transconductance operational amplifiers 2101, 2201 (RCA CA3280). The gain of the amplifiers are directly proportional to the magnitudes of the control currents appearing on conductors 357, 341.

As shown in FIG. 21, high pass filter 362 is formed from an operational amplifier 2103 connected with resistors 2105, 2107 and capacitors 2109, 2111, as shown.

Figure 23:
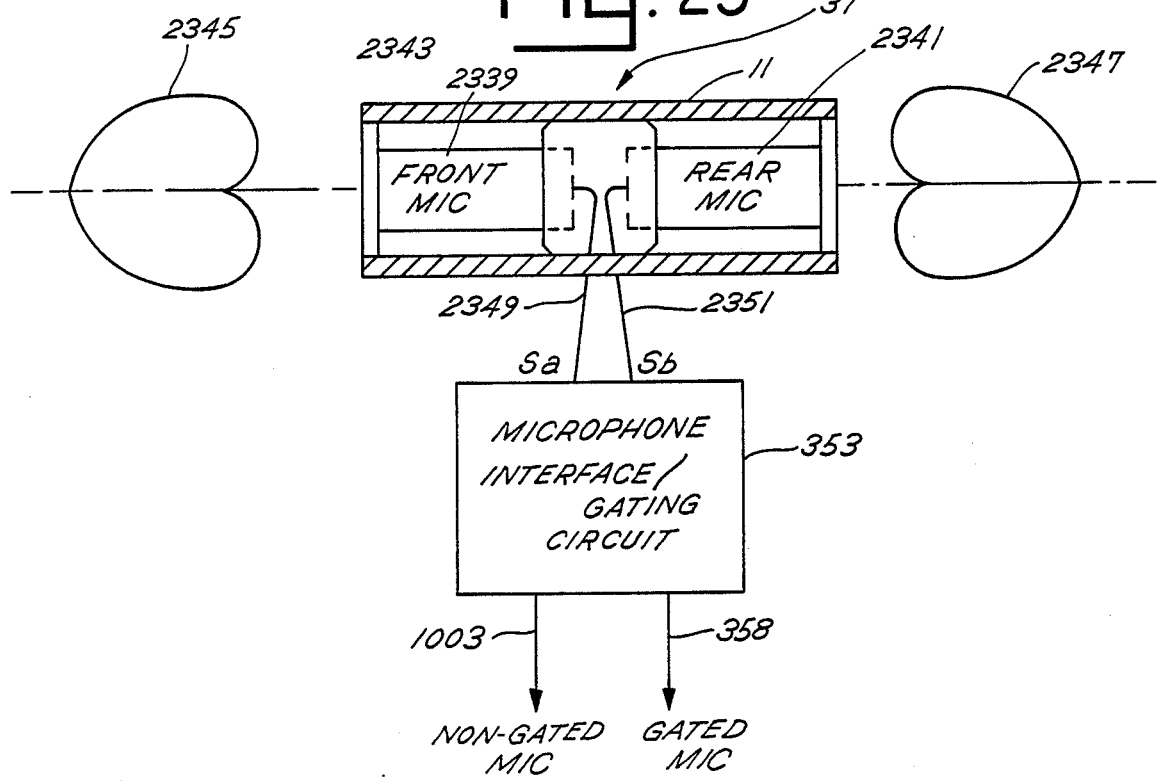
FIGS. 23 and 24 disclose block diagrams of the microphone interface/gating circuit and associated microphone of the teleconferencing system embodiment.

Microphones 11 and microphone interface/gating circuit 353 is described in detail in the previously identified patent application, Ser. No. 429,430, incorporated herein by reference. As shown in FIG. 23, each microphone 11 includes a front microphone element 2339 and a rear microphone element 2341 which are fixed relative to one another. Each microphone element is a single acoustic transducer that converts acoustical energy to electrical energy.

Front microphone element 2339 is positioned in a housing 2434 for monitoring primarily the front area of microphone 11 while rear microphone element 2341 is positioned for monitoring primarily the rear area of the microphone.

Microphone elements 2339, 2341 are unidirectional microphone elements which receive sound in accordance with their unidirectional characteristics. A cardioid pattern 2345 represents the relative sensitivity of microphone element 2339 to sound originating from various angles relative to the element. Similarly, microphone element 2341 responds to sound from various angles as represented by cardioid pattern 2347.

The "front" microphone element 2339 develops an electrical signal "Sa" along a conductor 2349 in response to acoustic sound waves. Similarly, rear microphone element 2341 develops an electrical signal "Sb" along a conductor 2351 in response to received sound. Conductors 2349, 2351 feed their respective electrical signals to microphone interface/gating circuit 353.

Gating circuit 353 monitors the magnitudes of the two signals Sa, Sb relative to one another. Signal Sa is gated to conductor 358 depending on the signal strength of signal Sa relative to signal Sb.

As understood, a gating characteristic dependent on the position of a sound source relative to microphone 11 is obtained. Discrimination in gating is achieved against sounds to the side and rear of the microphone, and reverberant sound and diffuse room noise which would produce equal outputs from the front and rear microphone elements 2339, 2341. As will suggest itself, other types and arrangements of microphones may be utilized to form a gated microphone 11.

Signal Sa also appears non-gated (continually) on conductor 1003 for application to PA output mixer 1000, as described previously.

Figure 24:
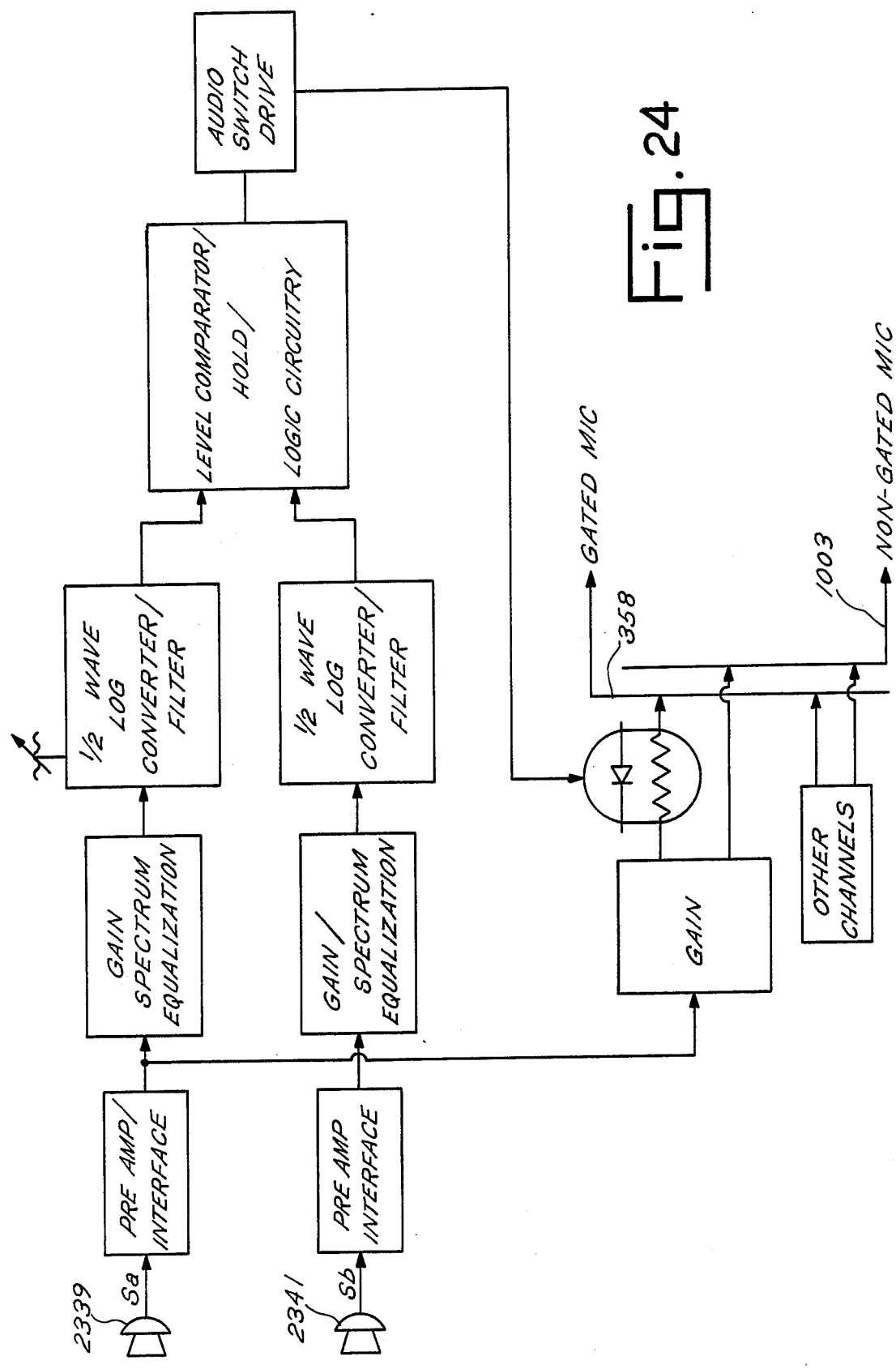

Referring to FIG. 24, a block diagram of microphone interface/gating circuit 353 is illustrated. The specific circuitry and description of the operation of circuit 353 is described in detail in the aforementioned patent application Ser. No. 429,430, which is incorporated herein by reference. FIG. 24 is provided herein to visually indicate in block form the circuitry which is included in microphone/interface gating circuit 353.

As understood, the gating of signal Sa to conductor 358 is maintained past the cessation of the gate triggering sound source (local speech). This is fixed in the system under discussion at 0.4 seconds followed by a 0.3 fade-out to the gated off condition. Thus, the microphone signal Sa is gated off (not applied to conductor 358) in less than 0.8 seconds following local speech as discussed previously.

An override function (described in the copending application) which forces signal Sa to be continually applied to conductor 358 must not be used during normal conference system operation. A mute function (also described in the copending application) which prevents signal Sa from being applied to conductor 358 may be used to disengage individual microphones 11 from the conference.

What is claimed is:

1. A teleconferencing system for use with at least one communication link and for use with at least one microphone which generates a microphone signal and for use with at least one loudspeaker for generating sound in response to a loudspeaker signal, comprising:
    input/output means for receiving from a communication link a receive signal carrying a distant speech signal which represents distant speech occurring in time, and for sending a send signal onto a communication link;
    microphone signal input means for receiving a microphone signal carrying a local speech signal which represents local speech occurring in time;
    loudspeaker output means for passing a loudspeaker signal to a loudspeaker;
    send mode/receive mode determining means for generating an electrical signal representative of a mode of suppression of either a send mode of suppression or a receive mode of suppression, said mode determining means detecting the occurrence of distant speech as represented by said distant speech signal carried by said receive signal and detecting the occurrence of local speech as represented by said local speech signal carried by said microphone signal, said determining means being responsive to the order in time of the detection of said distant speech and said local speech for generating said electrical signal representative of a said mode of suppression, said send mode/receive mode determining means including interrupt means for monitoring at least one occurrence within a predetermined time interval of both said local speech and said distant speech for switching said mode of suppression as represented by said electrical signal; and
    variable gain circuitry means for generating said loudspeaker signal, said loudspeaker signal carrying said distant speech signal in response to said receive signal, said variable gain circuitry means for generating said send signal, said send signal carrying said local speech signal in response to said micrphone signal, said circuitry means including suppression means for controlling the gain of said loudspeaker signal and the gain of said send signal in accordance with the mode of suppression represented by said electrical signal.

2. A teleconferencing system according to claim 1 wherein said suppression means includes:
    volume control means manually actuable for generating a loudspeaker volume control signal for controlling the gain of said loudspeaker signal when said electrical signal represents a receive mode of suppression; and
    receive compression means responsive to the amplitude level of said receive signal for generating a receive compression signal for automatically controlling the gain of said loudspeaker signal when said electrical signal represents a receive mode of suppression.

3. The teleconferencing system according to claim 2 wherein said input/output means includes input/output input means for receiving said receive signal and input/output output means for sending said send signal, and wherein a gain exists from said input/output input means to said input/output output means, and wherein said suppression means automatically varies the gain of said send signal in response to said volume control signal and said receive compression signal for maintaining a substantially constant gain from said input/output input means to said input/output output means.

4. The teleconferencing system according to claim 1 wherein said send mode/receive mode determining means monitors said local speech as represented by said local speech signal carried by said microphone signal and monitors said distant speech as represented by said receive signal, said determining means including monitoring means for monitoring a sole occurrence of either said local speech or said distant speech for generating said electrical signal representative of a send mode of suppression or a receive mode of suppression, respectfully.

5. The teleconferencing system according to claim 1 wherein said send mode/receive mode determining means includes a bistable device for generating an output logic signal as said electrical signal, said bistable device being switchable for changing the state of said output logic signal, said output logic signal having a first output state representing a send mode of suppression and a second output state representing a receive mode of suppression, said interrupt means switching said bistable device for changing the state of the said logic signal.

6. The teleconferencing system according to claim 5 wherein said interrupt means includes a pair of retriggerable one-shots, one of said one-shots being triggered upon the detection by said determining means of the occurrence of said distant speech as represented by said distant speech signal carried by said receive signal and the other of said one-shots being triggered upon the detection of said local speech as represented by said local speech signal carried by said microphone signal.

7. A teleconferencing system according to claim 5 wherein said interrupt means generates an interrupt logic signal having a first state and a second state, said interrupt means switching said interrupt logic signal between said first and second states, said first state indicating the occurrence of both said local speech and said distant speech within an immediately preceding time interval equal to said predetermined time interval.

8. A teleconferencing system according to claim 7 wherein said interrupt means switches said bistable device by switching said interrupt logic signal to said first state.

9. The teleconference system according to claim 8 wherein said interrupt means includes delay means for inhibiting swithcing of said bistable device within a preset time from the switching of said interrupt logic signal to said first state.

10. The teleconferencing system according to claim 1 wherein said send mode/receive mode determining means includes means for detecting the occurence of local speech as represented by said local speech signal carried by said microphone signal, said means for detecting the occurrence of local speech including: means for generating a level signal representative of the level of said local speech signal and comparator means for comparing said level signal with respect to a threshold level.

11. The teleconferencing system according to claim 10 wherein said threshold level is variable.

12. The teleconferencing system according to claim 11 wherein said means for detecting the occurrence of local speech as represented by said local speech signal carried by said microphone signal includes means for rectifying and filtering said microphone signal.

13. A teleconference system according to claim 11 wherein said threshold level is increased a fixed amount in response to detection of distance speech and no detection of local speech by said send mode/receive mode determining means.

14. The teleconferencing system according to claim 1 wherein said send mode/receive mode determining means includes means for detecting the occurrence of distant speech as represented by said distant speech signal, said means for detecting the occurrence of distant speech including a variable threshold comparison means for preventing false detection of said distant speech caused by background noise signals in said receive signal.

15. A teleconferencing system according to claim 1 wherein said suppression means includes suppression adjustment means manually actuable for generating a suppression adjustment signal for controlling the gain of said send signal when said electrical signal represents a receive mode of suppression and for controlling the gain of said loudspeaker signal when said electrical signal represents a send mode of suppression.

16. A teleconferencing system according to claim 1 wherein said send mode/receive mode determining means includes a bistable device for generating a first logic signal as a first output state for establishing a send mode of suppression and a second logic signal as a second output state establishing a receive mode of suppression.

17. The teleconferencing system according to claim 1 and further including at least one mircophone and a loudspeaker, said at least one microphone is a direct-sensitive microphone which is gated on in response to a sound source within an acceptance angle;

and said loudspeaker is located outside of said acceptance angle of said at least one microphone.

18. A teleconferencing system according to claim 17 and further including microphone interface/gating circuit means for gating on said at least one microphone to provide at the output of said microphone interface/gating circuit means a microphone signal carrying local speech information which represents local speech occurring in time.

19. A teleconferencing system according to claim 18 wherein said microphone signal input means is electrically connected to the output of said microphone interface/gating circuit means for receiving a microphone signal carrying local speech information.

20. A teleconferencing system according to claim 1 wherein said interrupt means generates an interrupt signal indicating the occurrence of both said local speech and said distant speech within an immediately preceding time interval equal to said predetermined time interval.

21. The teleconferencing system according to claim 1 and further including a plurality of microphones each of which generates microphones signals and each of which are gated on in response to a sound source within an acceptance angle; and a mixer having a variable gain for combining said microphone signals, the gain of said mixer being responsive to the number of said microphones which are gated on, for maintaining a substantially constant gain from said loudspeaker output means to said microphone signal input means.

22. The teleconferencing system according to claim 1 wherein said send mode/receive mode determining includes detection means for detecting the occurrence of distant speech as represented by said distant speech signal carried by said receive signal, said detection means includes threshold comparator means for comparing a signal representative of the level of said receive signal with respect to a threshold level.

23. The teleconferencing system according to claim 22 wherein said threshold comparator means includes a variable threshold, said threshold being varaible in response to a signal representative of the level of said send signal.

24. The teleconferencing system according to claim 22 and wherein said send mode/receive mode determining means includes receive compression means responsive to the amplitude level of said receive signal for generating a receive compression signal, and wherein said threshold level is responsive to said receive compression signal.

25. The teleconferencing system according to claim 1 and for use with a two wire communication link wherein said receive signal includes contamination from said send signal, and wherein said send mode/receive mode determining means includes detection means for detecting the occurrence of distant speech as represented by said distant speech signal, said detection means includes threshold comparator means for comparing a signal representative of the level of said receive signal contaminated with send signal with respect to a threshold level.

26. The teleconferencing system according to claim 25 wherein said threshold comparator means includes a variable threshold, said theshold being variable in response to a signal representative of the level of said send signal.

27. The teleconferencing system according to claim 1 wherein said predetermined time interval is eight-tenths of one second.

* * * * *